United States Patent
Velic et al.

(10) Patent No.: US 12,070,693 B2
(45) Date of Patent: Aug. 27, 2024

(54) SYSTEM AND METHOD FOR TOY RECOGNITION

(71) Applicant: LEGO A/S, Billund (DK)

(72) Inventors: Marko Velic, Zagreb (HR); Karsten Østergaard Noe, Aarhus V (DK); Jesper Mosegaard, Tilst (DK); Brian Bunch Christensen, Aarhus N (DK); Jens Rimestad, Skødstrup (DK)

(73) Assignee: LEGO A/S, Billund (DK)

( * ) Notice: Subject to any disclaimer, the term of this patent is extended or adjusted under 35 U.S.C. 154(b) by 0 days.

(21) Appl. No.: 18/297,140

(22) Filed: Apr. 7, 2023

(65) Prior Publication Data

US 2023/0264109 A1    Aug. 24, 2023

Related U.S. Application Data

(63) Continuation of application No. 17/196,598, filed on Mar. 9, 2021, now Pat. No. 11,794,110, which is a
(Continued)

(30) Foreign Application Priority Data

Nov. 10, 2014    (GB) ..................... 1419928

(51) Int. Cl.
   *A63F 13/65*    (2014.01)
   *A63F 13/213*   (2014.01)
   (Continued)

(52) U.S. Cl.
   CPC ............ *A63F 13/65* (2014.09); *A63F 13/213* (2014.09); *A63H 33/08* (2013.01);
   (Continued)

(58) Field of Classification Search
   CPC ..... A63F 13/65; A63F 13/213; G06V 10/772; G06V 10/774; G06V 20/64; G06V 20/66;
   (Continued)

(56) References Cited

U.S. PATENT DOCUMENTS 3,005,282 A    10/1961  Christiansen
D253,711 S     12/1979  Christiansen et al.
(Continued)

FOREIGN PATENT DOCUMENTS

EP    2521092 A1    11/2012
EP    2749327 A1    7/2014
(Continued)

OTHER PUBLICATIONS

Albo-Canals, "DTCNN Implementation in a LEGO Mindstorm NXT for Infrared and Ultrasonic Sensor Data Processing", IEE 12th Workshop on Cellular Nanoscale Networks and their Applications (CNNA), IEEE, 2010.
(Continued)

*Primary Examiner* — David L Lewis
*Assistant Examiner* — Shauna-Kay Hall
(74) *Attorney, Agent, or Firm* — Day Pitney LLP; George Chaclas; Anthony A. Kassas

(57) ABSTRACT

A recognition system for recognizing real-world toy objects from one or more images having an image capturing device and one or more processors. The processor implements a detection module, a recognition module, and a user experience module, and is configured to capture an image of a real-world scene, and detect one or more regions of interest in the image. The recognition system is configured to generate at least one part-image from the captured image, each part image including at least one of the one or more detected regions of interest, and feed the generated part-image to the recognition module. The recognition system is
(Continued)

configured to recognize a real-world toy object in the part-image, the real-world toy object comprising at least one toy construction element, and provide a digital representation of the recognized real-world toy object.

20 Claims, 5 Drawing Sheets

Related U.S. Application Data continuation of application No. 16/258,739, filed on Jan. 28, 2019, now Pat. No. 10,974,152, which is a continuation of application No. 15/524,944, filed as application No. PCT/EP2015/076073 on Nov. 9, 2015, now Pat. No. 10,213,692.

(51) Int. Cl.
| | |
|---|---|
| A63H 33/08 | (2006.01) |
| G06F 18/2413 | (2023.01) |
| G06F 18/28 | (2023.01) |
| G06N 3/04 | (2023.01) |
| G06N 3/08 | (2023.01) |
| G06N 5/04 | (2023.01) |
| G06V 10/75 | (2022.01) |
| G06V 10/772 | (2022.01) |
| G06V 10/774 | (2022.01) |
| G06V 20/64 | (2022.01) |
| G06V 20/66 | (2022.01) |

(52) U.S. Cl.
CPC .......... *G06F 18/2413* (2023.01); *G06F 18/28* (2023.01); *G06N 3/04* (2013.01); *G06N 3/08* (2013.01); *G06N 5/04* (2013.01); *G06V 10/751* (2022.01); *G06V 10/772* (2022.01); *G06V 10/774* (2022.01); *G06V 20/64* (2022.01); *G06V 20/66* (2022.01)

(58) Field of Classification Search
CPC ..... G06F 18/28; G06F 18/2413; A63H 33/08; G06N 3/04; G06N 3/08; G06N 5/04
See application file for complete search history.

(56) References Cited

U.S. PATENT DOCUMENTS

| | | |
|---|---|---|
| 6,259,815 B1 | 7/2001 | Anderson et al. |
| 6,290,565 B1 | 9/2001 | Galyean, III et al. |
| 6,351,265 B1 | 2/2002 | Bulman |
| 7,092,899 B2 | 8/2006 | Simas et al. |
| 7,755,620 B2 | 7/2010 | Scherer et al. |
| 8,388,151 B2 | 3/2013 | Huebner |
| 8,452,108 B2 | 5/2013 | Walch |
| 8,813,111 B2 | 8/2014 | Guérin et al. |
| 8,855,366 B2 | 10/2014 | Wagner et al. |
| 8,864,589 B2 | 10/2014 | Reiche, III |
| 8,965,114 B2 | 2/2015 | Aoba |
| 9,011,246 B1 | 4/2015 | Kier et al. |
| 9,039,532 B2 | 5/2015 | Canessa |
| 9,076,257 B2 | 7/2015 | Sharma et al. |
| 9,141,714 B2 | 9/2015 | Boncyk et al. |
| 9,259,651 B1 | 2/2016 | Yano |
| 9,336,456 B2 | 5/2016 | Delean |
| 9,409,084 B2 | 8/2016 | Horovitz et al. |
| 9,424,488 B2 | 8/2016 | Simske et al. |
| 9,483,714 B2 | 11/2016 | Aoba |
| 9,547,871 B2 | 1/2017 | Bala et al. |
| 9,582,147 B2 | 2/2017 | Matsumura |
| 9,690,373 B2 | 6/2017 | Haseltine |
| 9,747,307 B2 | 8/2017 | Kier et al. |
| 9,989,965 B2 | 6/2018 | Cuban et al. |
| 10,089,772 B2 | 10/2018 | Taylor et al. |
| 10,315,119 B2 | 6/2019 | Reiche et al. |
| 10,796,494 B2 | 10/2020 | Wright et al. |
| 2002/0196250 A1 | 12/2002 | Anderson et al. |
| 2003/0132966 A1 | 7/2003 | Simas et al. |
| 2007/0063997 A1 | 3/2007 | Scherer et al. |
| 2007/0097832 A1 | 5/2007 | Koivisto et al. |
| 2007/0262984 A1 | 11/2007 | Pruss |
| 2008/0231611 A1* | 9/2008 | Bathiche ............. A63F 3/00643 345/175 |
| 2008/0310715 A1 | 12/2008 | Simske et al. |
| 2009/0324107 A1 | 12/2009 | Walch |
| 2011/0019162 A1 | 1/2011 | Huebner |
| 2011/0098092 A1 | 4/2011 | Reiche, III |
| 2012/0155751 A1 | 6/2012 | Aoba |
| 2012/0295703 A1 | 11/2012 | Reiche et al. |
| 2012/0304059 A1 | 11/2012 | McCloskey |
| 2012/0306853 A1 | 12/2012 | Wright et al. |
| 2013/0053141 A1 | 2/2013 | Guerin et al. |
| 2013/0216094 A1 | 8/2013 | Delean |
| 2013/0217294 A1 | 8/2013 | Karunaratne |
| 2014/0098991 A1* | 4/2014 | Yang .................. G06V 10/758 382/103 |
| 2014/0121008 A1 | 5/2014 | Canessa |
| 2014/0184644 A1 | 7/2014 | Sharma et al. |
| 2014/0256430 A1 | 9/2014 | Matsumura |
| 2014/0273729 A1 | 9/2014 | Colbert |
| 2014/0274313 A1 | 9/2014 | Bala et al. |
| 2014/0274405 A1 | 9/2014 | Colbert |
| 2014/0293045 A1 | 10/2014 | Horovitz et al. |
| 2014/0294292 A1 | 10/2014 | Aoba |
| 2014/0329598 A1* | 11/2014 | Horovitz ................ G06F 18/00 463/31 |
| 2014/0378022 A1* | 12/2014 | Muthyala ................ G06T 19/20 446/91 |
| 2015/0063712 A1 | 3/2015 | Boncyk et al. |
| 2015/0209664 A1 | 7/2015 | Haseltine |
| 2015/0310041 A1 | 10/2015 | Kier et al. |
| 2015/0339520 A1 | 11/2015 | Yu et al. |
| 2016/0067604 A1 | 3/2016 | Yim et al. |
| 2016/0314609 A1 | 10/2016 | Taylor et al. |
| 2017/0053169 A1 | 2/2017 | Cuban et al. |

FOREIGN PATENT DOCUMENTS

| | | |
|---|---|---|
| WO | 2004034333 A1 | 4/2004 |
| WO | 2011017393 A1 | 2/2011 |
| WO | 2012160055 A1 | 11/2012 |
| WO | 2014/014524 A1 | 1/2014 |

OTHER PUBLICATIONS

Chen et al., "Estimating finger grip force from an image of the hand using Convolutional Neural Networks and Gaussian Processes", IEE International Conference on Robotics & Automation (ICRA), Hong Kong Convention and Exhibition Center, pp. 3137-3142, IEEE, May 31, 2014.
Extended European Search Report issued in related European patent application No. 20187091.2, Sep. 14, 2020.
Filho et al., "Recognition and Separation of Objects on a Lego Mindstorms NXT Conveyor Belt using Log-Polar Transform and Artificial Neural Networks", IEEE Brazilian Robotics Symposium and Latin American Robotics Symposium, pp. 290-295, IEEE, 2012.
Hinton et al., "Improving neural networks by preventing co-adaptation of feature detectors", Jul. 3, 2012. URL: http://arxiv.org/pdf/1207.0580.pdf.
International Search Report issued in corresponding international application No. PCT/EP2015/076073, mailed Feb. 19, 2016.
IPO's Search Report under Section 17, issued in related GB application No. 1419928.5, Oct. 13, 2015.
Lecun et al., "Backpropagation Applied to Handwritten Zip Code Recognition", Neural Computation 1:541-551, 1989.
Lu et al., Fast and Globally Convergent Pose Estimation from Video Games, IEEE Transactions on Pattern Analysis and Machine Intelligence, 22:6, 610-622, Jun. 2000.

(56) References Cited

OTHER PUBLICATIONS

Nair et al., "Rectified Linear Units Improve Restricted Boltsmann Machines", Proceedings of the 27th International Conference on Machine Learning, Haifa, Israel, 2010.
Non-Final Office Action issued in related U.S. Appl. No. 15/524,944, filed Mar. 9, 2018.
Notification of Transmittal and International Preliminary Report on Patentability together with amended sheets of claims, issued in corresponding international application No. PCT/EP2015/076073, mailed Jan. 26, 2017.
Written Opinion issued in corresponding international application No. PCT/EP2015/076073, mailed Feb. 19, 2016.
EP Extended Search Report corresponding to Application No. 24159537.0, dated Jun. 18, 2024, 11 pages.
Cireşan et al., "Multi-column Deep Neural Networks for Image Classification", IDSIA, IDSIA Technical Report No. IDSIA-0442, dated Feb. 2012, 20 pages.

\* cited by examiner

SYSTEM AND METHOD FOR TOY RECOGNITION

CROSS-REFERENCE TO RELATED APPLICATIONS

The present application is a Continuation of and claims the benefit of priority to U.S. patent application Ser. No. 17/196,598, filed Mar. 9, 2021, which is a Continuation of and claims the benefit of priority to Ser. No. 16/258,759, filed Jan. 28, 2019, which is a Continuation of and claims the benefit of priority to U.S. patent application Ser. No. 15/524,944, filed May 5, 2017, which is a National Stage Entry of and claims the benefit of priority to International Application No. PCT/EP2015/076073, filed Nov. 9, 2015, which claims the benefit of priority to GB Patent Application No. 1419928.5, filed Nov. 10, 2014, the contents of each of the above referenced patent applications is incorporated herein by reference in its entirety for any purpose whatsoever.

FIELD OF THE DISCLOSURE

The present disclosure relates to the application of computer vision technology for toys-to-life applications and, more particularly, to a system and a method for detection and recognition of construction toy objects. e.g. toy objects that use modular, mutually interconnectable toy construction elements. Some embodiments relate to the detection and recognition of construction toys based on dimensional constants and their assemblies based on convolutional neutral networks.

BACKGROUND OF THE DISCLOSURE

Different attempts of integrating virtual representations of physical objects into a virtual game play have been made. However, a close link between the physical world and a virtual game play stimulating the interactive involvement of the user and, in particular, stimulating the development of different skills by children's game playing is still missing. Therefore there is a need for a new approach to interactive game play.

Most toy-enhanced computer games or so-called toys-to-life systems currently involve systems wherein toys must have a physical component configured to communicate with a special reader via some form of wireless communication like RFID, NFC etc. Examples of such systems are disclosed in e.g. US 2012/0295703, EP 2749327 and US 20142256430. It would be generally desirable to provide game systems that do not require the toy to comprise elements that are capable of communicating with a reader device so as to be able to identify a toy element, and to create its virtual digital representation and associate it with additional digital data.

WO 2011/017393 describes a system that uses computer vision to detect a toy construction model on a special background. To this end, an assembled model is on a special background plate with a specific pattern printed on it. In some systems the image-acquiring device may even need to be aligned to a specific angle relative to the toy element assembly for the recognition to take place. It would thus generally be desirable to increase the robustness of such methods, e.g. by reducing their sensitivity to one or more of the following parameters: The distance between a toy element from the image acquiring device, for example a camera, the rotation of the toy element, the angle of the camera, the background, the illumination, or the need for a predefined region where a toy element should be placed.

Document U.S. Pat. No. 8,855,366 discloses a method and apparatus for tracking three-dimensional (3D) objects. This prior art method of tracking a 3D object includes constructing a database to store a set of two-dimensional (2D) images of the 3D object using a tracking background, where the tracking background includes at least one known pattern, receiving a tracking image, determining whether the tracking image matches at least one image in the database in accordance with feature points of the tracking image, and providing information about the tracking image in respond to the tracking image matches the at least one image in the database. The method of constructing a database also includes capturing the set of 2D images of the 3D object with the tracking background, extracting a set of feature points from each 2D image, and storing the set of feature points in the database. However, the above prior art method requires the extraction of feature points and it requires a tracking background. It would thus be desirable to provide a method that is robust with respect to the choice of background and with respect to the rotation of the object. Accordingly it is desirable to provide a robust method that enables easy application. It is further desirable to provide a method that results in accurate detection and recognition. In particular, it is desirable to provide a method whose accuracy of recognition depends only little on factors such as rotation, size, scale, illumination or background change.

SUMMARY

In accordance with one aspect disclosed herein, a system includes an image capturing device, and a processor configured to execute detection and recognition tasks and so as to identify one or more toy objects by utilizing a convolutional classification model such as a convolutional neural network or a hybrid convolutional classification model.

The toy objects may be individual modular toy construction elements of a toy construction system where the toy construction elements each comprise coupling members so as to allow the toy construction elements to be detachably interconnected with each other to form an assembly of toy construction elements. In some embodiments, the toy object may be an assembly of detachably interconnected modular toy construction elements, e.g. a figurine constructed from multiple parts, such as a torso part, leg parts, accessory parts, and/or the like. Such modular construction systems allow construction of a vast variety of assembled toy construction structures. An assembled structure may include few or many individual construction elements that may be identical or different from each other. Toy objects involving modular toy construction elements have so far proven difficult to be detected in an efficient yet reliable and robust manner.

Convolutional classification models such as convolutional neural networks allow for very accurate and robust object recognition and thus provide a very reliable method for recognition of toy construction elements and their assemblies. Neural networks, especially deep convolutional neural networks, have previously been suggested for various object recognition tasks and been reported to demonstrate good performance on standardized, controlled benchmark tasks. LeCun et al "Backpropagation Applied to Handwritten Zip Code Recognition", Neural Computation 1, 541-551, 1989, describes a convolutional network architecture for reading handwritten zip codes.

The present inventors have found that, even for construction toys comprising multiple toy construction elements, even under non-standardized conditions, a recognition may be achieved that is largely invariant to various common problems in computer vision tasks like rotation, size, scale, illumination or background change. The results achieved by embodiments of the methods and system disclosed herein provide an easy and fast recognition of toy objects without affecting accuracy.

Embodiments of the system described herein comprise a model creation system that creates a mathematical classification model and a recognition system that uses the created mathematical classification model. The model creation system will also be referred to as a training system as it is configured to create a trained deep convolutional classification model such as a deep convolutional neural network model. The training and recognition systems may each comprise an image capturing system and a processor. It will be appreciated that, in some embodiments, the training system and the recognition system may share a common image capturing device while other embodiments may use respective image capturing devices in the training and recognition phases, respectively. Similarly, the training and recognition systems may use a common processor or different processors.

In particular, as the training process may be computationally demanding, the training process may be performed by a suitably powerful processor, such as a GPU. Accordingly, according to some embodiments, the training system comprises a graphics processing unit (GPU) configured to perform a process of training a deep convolutional classification model. The use of general purpose computing on graphics processing units (GPGPU) allows for training of even very complex deep convolutional classification model architectures in reasonable time. In particular, a layered neural network model may be represented by vectors of artificial neurons where the interconnections of neurons of respective layers (the interconnections are also referred to as weights) may be represented as matrices. A training process for training a neural network model from examples may therefore efficiently be implemented as multiple vector-matrix and matrix-matrix operations, e.g. on a GPU. This allows for training very accurate classification models invariant of various common image recognition problems like scale, rotation, illumination, background changes etc.

The training system comprises an image capturing device, e.g. including a camera. In some embodiments, the camera is a digital camera such as a conventional digital camera. In some embodiments, the image capturing device comprises a 3D capturing device such as a 3D sensitive camera, e.g. a depth sensitive camera combining high resolution image information with depth information. An example of a depth-sensitive camera is the Intel® RealSense™ 3D camera, such as the model F200 available in a developer kit from Intel Corporation.

Some embodiments of the training system comprise an image acquisition station which may comprise the image capturing device, e.g. one or more digital cameras, and an object support for receiving a physical toy object whose image is to be captured. The image acquisition station may further comprise one or more mechanisms for changing the viewpoint of the camera relative to the object support. For example, the camera may be movably mounted or the object support may be movably mounted, e.g. rotatably mounted and/or movable such that a distance between the camera and the object support and/or a relative orientation between them may be varied. The image acquisition station may further comprise one or more light sources and, optionally, an illumination controller adapted to change the illumination of the physical toy object, e.g. the intensity and/or color distribution of the illuminating light and/or the direction from which the toy object is illuminated. In some embodiments the image acquisition station may comprise a background member large enough to fill the field of view of the camera. In some embodiments the background member comprises a predetermined background such as a green screen or a variable background which allows physical toy objects to be captured in front of different backgrounds.

In particular, the training system may be configured to capture multiple images of each of a plurality of physical toy objects. The training system may further comprise an interface, e.g. a user-interface, for receiving object identifiers identifying the respective physical toy objects of which images a captured. These object identifiers are then used during the training process so as to obtain a trained classification model that is capable of predicting correct object identifiers of physical toy objects based on images of these toy objects. It will be appreciated that, in some embodiments, the object identifiers may be unique for each object while, in other embodiments, at least some object identifiers may be common for multiple different objects. e.g. objects of a certain type or class of objects. An object identifier may e.g. comprise a serial number or the like and/or a descriptive object identification and/or another suitable data item identifying a toy object or a class of toy objects.

In some embodiments, the training system is further adapted to perform one or more image processing operations on a captured image of a physical toy object so as to create one or more additional training images of the same toy object without having to capture additional images of the toy object. For example, the training system may be configured to change one or more parameters, such as contrast, colour distribution, etc. in respective versions of a captured image. In some embodiments, the process may process the captured image so as to replace a background part of the image by a different background part.

Some embodiments of the training system further comprise a database system for storing a plurality of training images of a plurality of physical toy objects, each image being associated with a corresponding object identifier identifying the physical toy object depicted in the corresponding image. The training database may be created by obtaining digital images of the toy objects to be recognized along with the information regarding which object is present in each image in the database. The set of input images, along with an indication of a correct object each image should be classified as, will also be called annotated database. The training images may comprise captured images, e.g. using the image acquisition station described herein or another suitable image capturing device. Alternatively or additionally, the training database may comprise digitally created images, e.g. processed versions of captured images that have been captured with a camera or other image capturing device.

The training database may thus be created by capturing or otherwise obtaining large number of images of toy objects that should be recognized. The set of images may include images of the toy objects on various surfaces, with various backgrounds, taken from different angles, at different zoom levels, rotations, with different scene positioning, and/or under different illumination conditions. Images may also be created by using more than one camera thus allowing for more variation in the training database. The bigger and more varied the training database of training images is, the more reliable predictions will be achieved when using the trained classification model as the variability of the training database helps preventing the classification model from overfitting the dataset.

To achieve a higher robustness for different colour intensities and for the learning process to be efficient, mean colour values from all the images may be calculated and subtracted from each image so as to normalize the colour intensities in the training database. In particular, for each image pixel, an average pixel value may be computed where the average pixel value is an average over the images used as training images during the training process. Additionally, at least for some types of activation functions, it may be desirable for the variance to be close to one to stay in the constraints of the activation function. To achieve this, the mean value may be calculated at the pixel level over the entire dataset and normalized with variance.

During the prediction time, the computed average pixel values are subtracted from the respective pixels of the captured images as well.

As mentioned above, additionally or alternatively, the training images may comprise digitally processed versions of the captured images. e.g. multiple, different processed versions of each of at least a subset of the captured images. Embodiments of a training database may thus comprise a plurality of different variants of images of toy objects with the accompanying information regarding the identification of the respective toy objects so as to allow for supervised learning. Hence, the training process may comprise a data augmentation process in which every image from the training database can be used to artificially generate more images through image processing steps like various distortions including but not limited to horizontal or vertical flipping, skewing (perception transform), resizing, rotating, colour intensity change, masking, modification of background portions, and/or cropping. In this way more variance is introduced in the set of annotated images on which the training is based. In some embodiments the augmentation process may be performed as a part of the creation of the training database and the generated additional images may be stored in the training database. Alternatively or additionally, in some embodiments, the training data can be expanded by way of augmenting using various transformations during the training of the classification model, i.e. on the fly instead of during the database creation. In this way, it may be ensured that the classification model does not see the exact same image many times. For example, the annotated images may be processed by applying a transformation (e.g. flipping, cropping, scaling, skewing, eroding, etc.) that has a degree of randomness, e.g. a parameter defining a degree or type of transformation. Such a parameterized transformation of an annotated image prior to using an annotated image in a training step may be varied randomly or quasi-randomly between different training steps that are based on the annotated image.

In some embodiments, due to the imprecision of the hardware used and/or due to noise in the real-world scene, some random crops can be sent to the recognition module which does not actually include a recognizable toy object. This may result in false recognitions by the recognition module. This may be mitigated if a number of various random crops are included in the training database as a special class indicating a background i.e. none of the specific expected toy objects. In this way, even if a random crop is sent to the classifier, the classifier can recognize it as a background class and the system may discard it. For example, when the recognized toy objects are subsequently inserted as virtual objects into a virtual scene, in this way, appearance of phantom toy objects in a virtual scene may be avoided.

Generally, the training system is configured to obtain a plurality of training images, each associated with an identifier of a physical toy object represented by the training image, and to perform a training process so as the create a trained classification model. The recognition system is configured to obtain one or more images of a toy object to be recognised and to process the captured image or images so as to detect and/or recognise the toy object where the recognition utilises the trained classification model. The recognition system may thus determine which of a set of known toy objects (or which of a set of known classes of toy objects) is depicted in a newly captured image; wherein the known (classes of) toy objects are those of which annotated images are included in the training database.

The training system is configured to execute a suitable training process based on some or all of the training images and the corresponding object identifiers stored in the training database.

To this end various embodiments of a training process involve solving for a minimization of a loss or optimization function defined as a part of the classification model setup. In supervised classification problems, the loss function may be the average loss (e.g. the average classification error) across the entire set of classes for which the model is being built. The loss function may be any suitable differentiable function such as mean squared error, cross-entropy cost or similar. Optimization methods include, but are not limited to Stochastic Gradient Descent (SGD), SGD with Momentum, Adaptive gradient (Adagrad), Adam, Adadelta, Nesterov Accelerated Gradients, RMSprop optimization or similar.

In some embodiments, the training process may include one or more mechanisms for combating overfitting. One such mechanism, suitable for embodiments using a neural network model, is the use of so-called dropout, see e.g. Hinton et al. "Improving neural networks by preventing co-adaptation of feature detectors" 2012, retrievable from http://arxiv.org/pdf/1207.0580.pdf. This method randomly excludes some neurons from the learning process at each learning step. The amount of excluded neurons is defined as an additional hyperparameter of the network. In this way, neurons are not subject to less important features during learning. Usually, interconnected neurons are subject to dropout although other neuron types could be dropped out too. The dropout technique slows down the learning process and it is not mandatory if enough natural variance exists in the training dataset and if training dataset is very big.

The resulting trained classification model may be stored in any suitable form e.g. as a suitable data structure that allows a recognition system to execute the trained classification model, i.e. to compute the output of the classification model for a given input image. After the training process has finished, a data structure containing the trained/optimized classification model can be stored on a digital storage medium and be ready for use in a recognition tasks. In some embodiments, the trained classification model is stored as an executable function, e.g. having a predetermined application programming interface. In some embodiments, the trained classification model is created as a dynamically linkable library that may be called by a suitable program executed on the recognition system. In some embodiments, the training process is executed by a training module which may also be referred to as a learning module. The training module may be operable to perform a process for training a deep convolutional classification model to recognize various toy objects. Training a classification model generally comprises presenting the classification model with multiple training inputs, comparing a corresponding model output of the classification model with a target output so as to determine a classification error or other suitable loss function, and to modify one or more adaptable model parameters so as to reduce the error or loss function. In embodiments of the system described herein, the training inputs include the digital images stored as annotated images in training database and the target outputs include the corresponding object identifiers of the annotated images. The model parameters include adaptable parameters of the convolutional layers of the network and/or of the classifier stage of the network, such as network weights connecting the artificial neurons of the neural network.

During some embodiments of the training process, each of at least a subset of the images from the training database is used as an input to the convolutional neural network and the output is calculated to determine how close or far off the proper object recognition network is. Then the error of the network is propagated back-wards throughout the network and modifications of the network's parameters are done by using a suitable optimization method e.g. stochastic gradient descent. This process may be conducted as a series of matrix multiplications and partial derivative calculations.

A trained neural network that is capable of achieving very accurate recognition of objects in images it has never seen before is preferably assembled of several or even many consecutive layers of artificial neurons. An artificial neuron of a neural network model may be represented as a function (e.g. a non-linear function) that receives, as its inputs, outputs from multiple neurons of a previous layer of the neural network and computes an output that is fed into one or more neurons of a subsequent layer. Hence, the initial or input layer of neurons receives as its inputs pixel values of at least a portion of an input image. The output of the final or output layer of neurons represents the output of the neural network model. In some embodiments, the output layer comprises a plurality of neurons, each representing one of the possible toy objects that can be recognized. The output of each neuron may represent a likelihood that an input image depicts the toy object represented by said neuron. Accordingly, when pixel values of a digital image are input to the input layer of the neural network model, the neurons of the input layer compute their respective outputs and feed them to the neurons of the subsequent layer. In this fashion, the information is successively fed forward through the network layer by layer to the output layer.

A deep convolutional neural network typically comprises several layers. These layers may include, but are not limited to, the following layer types: input layer, convolutional layers, pooling layers, rectification, normalization, nonlinear layers, interconnected layers, dropout layers, softmax layers and an output layer. A deep architecture of a classification model such as a neural network provides capabilities of recognizing complex shapes in hierarchical fashion similar to the process of object recognition in the visual cortex of animals or humans. The initial layers (i.e. layers proximate to the input layer) specialize on the detection of edges (gradients), colour and texture patterns while deeper layers specialize for recognition of the more complex formations and patterns including elements from the initial layers. Consecutive usage of convolutional and pooling layers allows for position invariance thus enabling object recognition at various locations within the image. A convolutional classification model typically receives a 2D input. For example, each element of the input layer may represent a pixel of the image. Each neuron of the first hidden layer may then represent a 2D kernel.

A convolutional classification model comprises a convolutional, feature-extracting stage and a classifier stage configured to receive an output of the convolutional stage. The convolutional stage may comprise one or more convolutional layers, optionally including one or more subsampling or pooling steps, each following a respective one of the convolutional layers. Convolutional layers do not classify the input on their own. During the adaptive training process, they are adapted to provide representations of the input signal through consecutive layers of abstraction, and their output is a vector with the highest level of abstractions. This vector is then used as an input into a classifier stage, such as a set of logistic units (e.g. a feedforward neural network), a support vector machine, one or more radial base functions, or another suitable classifier such as so-called randomized trees, Random Forests®, and/or a combination of the above. In some embodiments, the convolutional layers are followed by a classifier stage formed by one or more fully connected layers, e.g. as in a standard multilayer neural network. A convolutional classification model where the classifier stage is implemented as neural network model, such as a feedforward neural network model, e.g. comprising a number of fully-connected layers of artificial neurons, will be referred to as a convolutional neural network. A convolutional classification model where the classifier stage is implemented by a classifier other than a neural network will also be referred to as a hybrid convolutional model. The term fully-connected layers is intended to refer to layers where each neuron/activation unit of a layer is connected to, and receives an input from, a majority of, or even all, neurons of the preceding layer.

A convolutional classification model is considered a deep convolutional classification model when it comprises at least four layers, i.e. an input layer, an output layer and more than one hidden layers between the input and output layers. In some embodiments, a deep convolutional classification model may even comprise more layers, such as at least 5 layers, such as at least 6 layers. Classification model architectures, e.g. convolutional neural network architectures, comprising between 10 and 50 layers, such as between 12 and 40 layers, such as between 13 and 35 layers have been found particularly useful. In some embodiments, the convolutional classification model comprises a sequence of convolutional layers and, optionally, pooling layers, followed by classifier, In some embodiments, a classifier portion of the convolutional classification model comprises one or more fully connected layers where each neuron/activation unit is connected to and receives an input from a majority of or even all neurons of the previous layer.

In some embodiments, the input layer of the convolutional classification model represents an array of image pixels where each image pixel is represented by one or more values, each value representing a respective input channel. The input layer may thus be adapted to receive $m*n*c$ input values, where m and n are integer numbers larger than 1 and c is an integer larger or equal to 1, where m represents the height and n the width of a two-dimensional input image, measured in numbers of pixels. Each image pixel may represent one or more values as defined by the number of channels c. In some embodiments, $c=3$ corresponding to three color channels (e.g. red, green and blue). In other embodiments, c may be equal to 1, if the image is monochromatic, or c=4 e.g. if there is an additional depth component, or c may even be larger than 4. e.g. if other color spaces or sensors are used.

In some embodiments, at least some of the subsequent layers of the convolutional classification model have more channels than the input layer. In these layers, the number of channels represents the number of features the layer can learn. A convolutional layer may have k filters (or kernels) of size i*j*l where i and j are the width and height of the kernel, and l is the same as the number of channels c or smaller and may be different for each kernel, i.e. a kernel may span across one, some or all of the channels of the previous layer.

Convolution is performed over an input image by moving the filter over an image horizontally and vertically in steps, often called stride or s. The hyperparameter s can be s=1 or larger. If the stride is larger, model training will consume less memory. If the stride is smaller, the learned features will normally be smoother and often lead to better results. Convolution filters and their values play a similar role as weight parameters between neurons in different layers in fully connected neural networks and they are adapted during the training process. Due to the shared weights and local ties (convolutions performed on a constrained receptive field), convolutional filters require much less parameters to be learned than a traditional fully connected neural network. A trained kernel may be regarded as a feature detector. An image resulting from convolving an input image with a trained kernel may thus be referred to as a feature map.

After obtaining said feature maps with the convolution operation, the resulting images may be subsampled (or "pooled") to reduce the computational requirement for further processing. In some embodiments, subsampling is performed locally on regions of size p*q where p is the height and q is the width of the region. A subsampling operation may comprise a calculation of the mean value or the calculation of the maximum value over the pooled pixels (referred to as mean pooling or max pooling, respectively) or any other statistical parameter, if the pooling area is large enough (e.g. 2*2 pixels, 3*3 pixels, or more) than the same feature from the input images can cause the same calculation result in the pooling operation even if it is slightly translated in different input images. As mentioned earlier, convolution is usually applied with more than one filter which results in more than one feature map or channels. Pooling may thus be applied to each of the channels (feature maps). This introduces additional translational invariance (spatial convolution has translational invariance on its own due to detection of the same feature anywhere in the image) into the network and object recognition and detection can benefit from this property. Although additional translational invariance is beneficial, as is the reduction in computational complexity, a pooling operation inherently discards information and should thus be performed with care. Besides average or max pooling, other operations could be used e.g. L2 pooling— taking the square root of the sum of the squares of the activations in the pooled region.

In some embodiments, the convolutional and pooling layers are arranged as a feature extracting stack or sequence of layers in a way that the last layer of the in feature extracting part is 1-dimensional and the number of layers in the stack depends on the input image size. The convolutional filters may all have a fixed size, e.g. always 3*3 pixels or always 4*4 pixels or always 5*5 pixels; similarly the pooling filters may all have a fixed size, e.g. smaller than the filter size of the convolutional filters, e.g. always 2*2 pixels or always 3*3 pixels or always 4*4 pixels.

One can use any activation function to introduce non-linearity and enable the learning process. Examples of these functions include a sigmoid function, a tan h function etc. One activation function that has proven to be especially useful in the learning of deep architectures is the rectified linear unit, also called ReLU, see e.g. Nair, Hinton, "Rectified Linear Units Improve Restricted Boltzmann Machines", Proceedings of the 27th International Conference on Machine Learning. Haifa, Israel, 2010. Rectification can be implemented as a special layer following the convolution or pooling layer. The output of a rectified linear unit with input x, weight vector w, and bias b is given by max(0,wx+b). Other activation functions e.g. leaky ReLU may also be used.

In some embodiments, the classification model comprises one or more local response layers which encourage the competition between neurons at the same spatial positions. It may be implemented as a normalization of values in a limited area of the input image. In one embodiment the local regions extend across nearby channels, but have no spatial extent; in another embodiment the local regions extend spatially, but are in separate channels.

The recognition system comprises an image capturing device, a processor, and a storage medium for storing the trained classification model. The recognition system may further comprise a display or other suitable output device.

The recognition system may perform detection and/or recognition operations. These operations may computationally be considerably less demanding than the training process. On the other hand, it may be desirable to perform the detection and/or recognition operations by a portable device, e.g. without the need to use computational resources of a remote host system. Hence, in some embodiments, the recognition system may utilise the processor of a portable device. It will be appreciated, however, that the recognition system may also be implemented as a client-server or a similar distributed system, where the image capture and other user interaction is performed by a client device, while the image processing and recognition tasks may be performed by a remote host system in communication with the client device.

During the recognition operation, a physical toy object is targeted with the image capturing device of the recognition system, e.g. an image capturing device including a camera. In some embodiments, the camera is a digital camera, e.g. a conventional digital camera such as a built-in camera of a portable processing device such as a tablet computer, a laptop computer, a smartphone or other mobile device. In some embodiments, the image capturing device comprises a 3D capturing device such as a 3D sensitive camera, e.g. a depth sensitive camera combining high resolution image information with depth information. An example of a depth sensitive camera is the Intel® RealSense™ 3D camera, such as the model F200 available in a developer kit from Intel Corporation.

In some embodiments, the image capturing device communicates with a display showing a scene as seen by the image capturing device so as to facilitate targeting the desired physical toy object whose image is to be captured. The image capturing device and/or the display further communicate with a processor and data storage of the recognition system. Preferably, the image capturing device, the processor and/or the display are integrated in a single mobile device, such as a tablet computer, a portable computer or the like. Alternatively, according to some embodiments, an image capturing device or a mobile device with an image capturing device may communicate with a computer, e.g. by wireless communication with a computing device comprising a processor, data storage and a display. In some embodiments, the image capturing device may be stationary relative to the physical object while, in some embodiment, the image capturing device and/or the toy object is moved around so as to capture a series of images of the physical object from different viewpoints. In some embodiments, the process comprises capturing a series of images of the toy object, from the same or from different viewpoints, and to detect changes in the physical object over time, e.g. due to a user adding toy construction elements to a toy construction model, removing toy construction elements from the toy construction model or repositioning toy construction elements relative to the toy construction model.

Some embodiments of a recognition system may comprise a detection module and a recognition module. The detection module may be configured to perform image detection of a captured image so as to detect one or more toy objects in the captured digital image. The detection module may thus output one or more part-images, also referred to as crops, each comprising an image of one of the detected toy objects. Alternatively, the detection module may output an indication of one or more regions of interest within the captured image, e.g. region of interest including a potentially recognizable toy object. The recognition module may thus receive the one or more part-images or region(s) of interest from the detection module. The recognition module may be configured to use a trained neural network model or other classification model to recognize the detected one or more toy objects that are detected in a new, previously unseen image in a real time, e.g. in the part-image(s) or region(s) of interest identified by the detection module. The recognition module may also be referred to as classification module as it may predict which of a number of predetermined classes a depicted toy object belongs to. It will be appreciated that the detection and recognition modules may be integrated into a single module or provided as separate modules. In some embodiments, the detection and recognition sub-processes may be performed iteratively. For example, the detection module may output one or more candidate regions or part-images which are then fed into the recognition module. The recognition module may then perform a classification for each of the candidate regions or part-images; based on the output of the classification model, one or more of the candidate regions/part-images may then be discarded, e.g. based on a confidence parameter output by the classification model, or based on an evaluation whether the predicted object class is consistent with prior knowledge about the scene, e.g. knowledge about other toy objects in the scene and about physical constraints of the placement and/or interconnection of toy objects relative to each other.

In some embodiments, the system is configured to recognise a hierarchical toy object, i.e. a toy object including multiple toy construction elements that may be inter-connected with each other. The system may thus output object identifiers of the individual toy construction elements. In some embodiments, the system may comprise a hierarchy of toy construction elements comprising different classes of elements, e.g. primary elements, such as figurines, minifigures, or the like and secondary elements that may be associated. e.g. connected, to the primary elements. Examples of such secondary elements may include accessories to a figurine or minifigure such as weapons, cloth items, tools, etc. Hence, based on the recognition of the individual elements, a composite recognition may be performed, e.g. identifying a primary element supplemented with one or more secondary elements, e.g. a knight carrying a sword and a shield.

Once the physical toy object has been recognised, this information may be used in a variety of ways. For example, the system may comprise a processing module configured to match the recognised one or more toy objects with additional information which may be stored in a central database or locally on the device implementing the recognition system or on the web. Such additional information may e.g. include information about attributes of a corresponding virtual object, e.g. connectivity information indicative of how a virtual toy construction element may be connected to other virtual toy construction elements, behaviour information indicative of how a virtual object can move or otherwise behave in a virtual world, and/or the like. In some embodiments, a virtual toy object corresponding to the recognised physical toy object may be inserted into a virtual world, as a virtual object or character in a game play and/or as a virtual construction element attached to a virtual construction model. For example, connectivity information may be stored and used to determine physical constraints for the placement of toy construction elements within a scene, e.g. as disclosed in WO 04/034333.

For example a virtual three-dimensional representation of the recognised physical toy object may be added to an existing virtual toy construction model made up of virtual toy construction elements. The virtual toy construction elements may correspond to physical toy construction elements in that they are direct representations of the physical toy construction elements having the same shape and proportions. The physical toy construction elements may be defined by a predetermined length unit (1 L.U.) in the physical space, wherein linear dimensions of the physical toy construction element in a Cartesian coordinate system in x-, y-, and z-directions of the physical space are expressed as integer multiples of the predetermined length unit in the physical space (n L.U.'s). Accordingly, the virtual toy construction elements are defined by a corresponding predetermined length unit, wherein linear dimensions of the virtual toy construction elements in a Cartesian coordinate system in x-, y-, and z-directions of the virtual space are expressed as integer multiples of the corresponding predetermined length unit in the virtual space. The predetermined unit length in the physical space and the corresponding predetermined unit length in the virtual space may be the same.

Many types of game play can be enhanced by recognising physical toy objects including, but not limited to, nurture-games, battle type games (player vs. player), racing games, and role playing action/resource games, virtual construction games, massive multiplayer online games, strategy games, augmented reality games, games on mobile devices, etc.

In some embodiments, the recognition system is configured to detect and recognize two or more toy objects in a captured digital image and to create two corresponding virtual characters in a video game. The system may further be configured to control interaction of the virtual characters with each other, automatically or responsive to user inputs, where one or more aspects or results of the interaction are at least in part controlled by virtual attributes of the recognized toy objects. For example, the interaction may involve two virtual characters engaging in a battle where capabilities or other attributes of the virtual characters are at least in part determined by features of the recognized objects, e.g. by detected and recognized accessories, such as weapons, shields, amour, etc. carried by or otherwise connected to the toy objects.

In some embodiments, the recognition system is configured to process the captured image so as to produce one or more processed versions of the captured image, and wherein the recognition system is configured to base the recognition on at least two images selected from the captured image and the one or more processed versions of the image, e.g. on the captured and one or more processed versions of the image or, alternatively, on two or more processed versions of the captured image. The processing step may comprise any suitable image processing mechanism, e.g. for changing the image contrast, color distribution, cropping, blurring, eroding, dilating, adding randomness masks or creating different image subcrops, etc. or combinations thereof. In some embodiments the processing includes defining at least a first part-image and a second part-image. In one embodiment, the first and second part images comprises an overlapping portion that is present in both part images and one or more distinct portions that are present in only one or only some of the part images. In some embodiments, processing the captured image comprises detecting a target object position within the captured image and selecting an object portion and a background portion, the object portion including the detected target object position; wherein the respective object portions of a first processed image and of a second processed image have different sizes and/or different shapes and include an overlapping object portion that is present in both object portions. In some embodiments the processing includes performing a noise-introducing operation on respective background portions (outside the corresponding object portions) of the first and second processed versions of the captured image, e.g. a blurring operation or a process that adds a noise component to the background portion or even replaces the background with noise (i.e. random pixel values). Basing the recognition on at least two images may comprise performing a majority decision, e.g. using an odd number, such as 3 images. In other embodiments, the recognition system creates respective lists of candidate toy objects for each individual processed image. The candidate toy objects each may have a confidence value associated with it that indicates a likelihood that the detected object is the corresponding candidate toy object. Basing the recognition on at least two images may thus comprise creating an aggregated list of candidate toy objects each having associated an aggregated confidence value, e.g. the sum or other combination of individual confidence values determined from the respective processed images.

In some embodiments, along with, or instead of, an image-based averaging where multiple processed versions of a captured image (eroded and/or dilated versions, versions with randomness masks or different image subcrops) are sent to the classifier, e.g. as described above, other methods to increase accuracy of classification may be used. One such method includes a model-based averaging. In model-based averaging, an ensemble of more than one classification model is used to classify the same image (or more images) and predictions are averaged (or otherwise combined) across all classes and thus a final decision is made based on a combination of the outputs of the different models. The models of an ensemble may have the same hyperparameters but may be trained with different initializations or on different data. Alternatively, the models of an ensemble may be models with different hyperparameters (different architectures). Empirically, this method increases the accuracy of the whole system. It will be appreciated that image-based averaging and model-based averaging may be combined.

In some embodiments, the recognition system may be configured to detect toy objects that have been added to a scene, e.g. by detecting changes in a scene based on a sequence of captured images. The detection module of the recognition system may generate a part image from the captured image that includes the detected change and feed the created part-image to the recognition module. The recognition module of the recognition system may thus perform a recognition process based on the part image so as to recognize the added toy object. In some embodiments, the toy objects are toy construction elements of a toy construction system each comprising coupling members that allow the toy construction element to be detachably connected to one or more other toy construction elements of the toy construction system based on a set of physical constraints imposed by the toy construction system. In particular, a toy construction element may be connected in a limited number of spatial configurations, i.e. in a limited number of positions and/or orientations relative to the other one or more toy construction elements. Hence, when the system knows which toy construction elements are already present in a scene—e.g. from previous iterations of a recognition process as described herein—the system may utilise the known physical constraints to facilitate the recognition of the newly added toy construction element. In particular, in some embodiments, the recognition module may provide a list of candidate toy objects each having a likelihood of being the newly added toy object. Each candidate toy object may be an individual toy construction element or in itself an assembly of two or more interconnected toy construction elements. The process may then determine whether placement of a candidate toy object at the detected position within the scene is compatible with the constraints imposed by the toy construction system. The process may thus determine a most likely one of the candidate toy objects determined by the recognition module.

In some embodiments, the recognition system may utilise a digital camera that provides a colour image—e.g. an RGB image—and additionally depth information. The additional depth information may be used to advantage by the recognition system. For example, the detection module of the recognition system may utilise the depth information for detecting a target toy object to be recognised. Alternatively or additionally, the recognition system may use the depth information for determining whether a candidate toy construction object can be positioned at the detected 3D position and/or orientation in accordance with the physical constraints imposed by the toy construction system. In some embodiments, the depth information may even be used as additional input to the trained neural network. The depth information may be provided in a number of forms, e.g. based on a 3D depth map, a map of local surface properties, such as surface curvatures, and/or the like.

In some embodiments, the detection module of the recognition system may further be operable to detect a presence of interfering objects that are not part of a toy construction model or of another scene to be analysed. For example, the process may be configured to detect moving objects that are discarded in the recognition process. Examples of such moving objects may e.g. be a hand or other body part of a user manipulating the toy construction model or other scene.

In some embodiments, the training system is configured to create, for each of a plurality of the annotated images, a representation of an output of the convolutional stage of the trained deep convolutional classification model when the classification model is presented with said annotated image. The training system is further configured to store a plurality of representations of the output of the convolutional stage produced by the trained classification model when presented with respective ones of the annotated images, each stored representation being associated with the object identifier associated with the respective annotated image. Hence the training process may produce not only a representation of the trained deep convolutional classification model but additionally a set of annotated representations of features extracted by the convolutional stage of the trained classification model from respective annotated images from the training database, each annotated representation being annotated with the corresponding object identifier. The output of the convolutional stage may be the output of a final layer, e.g. a final convolutional or pooling layer of the convolutional stage. The representation may comprise a vector representation of the output. If the annotated images having been captured under controlled conditions. i.e. for a known orientation of the toy object relative to the image capturing device and/or with the values of one or more other parameters being known. e.g. relative distance from the image capturing device, position, etc., the reference set of representations may further be annotated with the corresponding parameter values pertaining to the annotated image from which a reference representation has been created.

The set of annotated representations may then be stored in, or otherwise made available as a reference set of representations, to the recognition system for use in the recognition process. For example, the reference set of representations may be used to estimate an orientation and/or another attribute, in a captured image, of a toy object to be recognized which toy object is depicted in said captured image. To this end, once the recognition system has detected and recognized a toy object, the top convolutional layer activations represented as vector (or another suitable representation of the output of the convolutional stage of the trained classification model) can be extracted from the model after conducting a forward pass through the trained classification model with the captured image as an input. The extracted representation may then be compared to the set of representations gathered for the recognized toy object identifier during the training stage. i.e. for the particular class of objects which the object in the captured image has been classified as. For example, a reference representation having the smallest distance (e.g. Euclidean distance, Hamming distance, Mahalanobis distance, Cosine distance or any other mathematical distance measure) to the extracted representation may be considered as the most similar reference representation. If a reference set of representations for orientation estimation has been is captured under controlled conditions where the position and/or orientation of a toy object was known during the image capture process and this information was included in the annotation of the reference representation, then an approximate orientation of a toy object with respect to a camera viewpoint in a captured image can be determined as the orientation which corresponds to the identified most similar reference representation, or as a combination (e.g. by interpolation) of a set of most similar reference representations. This technique may eliminate the need for (or at least augment or supplement) 3D signal analysis to estimate the position and/or orientation of a toy object in a captured image and can be completely conducted on 2D images. At runtime, a comparison of the representation of the output of the convolutional stage of the classification model (e.g. in the form of a feature vector determined by the convolutional stage for a captured image may be conducted after the recognition step. Hence, a comparison may only be need with reference representations pertaining to the recognized object identifier, this operation is very fast. The result from this operation can even be averaged or otherwise combined with a suitable score from a 3D input (if available) and thus increase the accuracy of orientation estimation.

The present disclosure relates to different aspects including the system and method described above and in the following, corresponding apparatus, systems, methods, and/or products, each yielding one or more of the benefits and advantages described in connection with one or more of the other aspects, and each having one or more embodiments corresponding to the embodiments described in connection with one or more of the other aspects and/or disclosed in the appended claims.

In particular, according to one aspect, disclosed herein is a computer program en-coded on a computer readable medium, such as a disk drive or other memory device. The computer program includes an executable computer program code configured to instruct a data processing system to perform steps for training and/or for recognition and object recognition described herein. According to one aspect, a computer-readable medium has stored thereon instructions which, when executed by one or more central or graphics processing units, cause the central of graphics processing unit to perform an embodiment of the training process described herein.

According to another aspect, a computer-readable medium has stored thereon instructions which, when executed by one or more central or graphics processing units, cause the central of graphics processing unit to perform an embodiment of the recognition process described herein.

According to another aspect, a computer implemented method for automatic recognition and detection of real world toy construction elements which can be interconnected or combined such as brick, minifigure, minifigure part, weapon, object, accessories, animals or any other construction part or artefact from image or video in real time, comprises the steps of: reading a digital image, said image representing still image captured with digital camera or a fragment of a video sequence captured with video camera; creating a learning database of digital images containing toy elements; learning from captured images with a goal to be able to recognize toy element if present on an image; recognizing toy element if the said element is present on an image that has not been used in the learning step; segmenting image and detecting one or more toy elements present on a said digital image; matching the information from a central database or a web source with a recognized real world toy element.

According to a further aspect, disclosed herein are embodiments of a toy construction system including a plurality of toy construction elements, an image capturing device and a processor programmed to receive image data from the capturing device, the image data representing a digital image captured by the image capturing device. The processor is further configured to implement the steps of an embodiment of a method for recognizing real-world toy objects from the captured image as described herein, based on a trained deep convolutional classification model that is configured to recognize a plurality of toy objects, the plurality of toy objects including the plurality of toy construction elements.

According to a further aspect, disclosed herein are embodiments of an interactive game system including an image capturing device, a display adapted to show at least image data captured by the image capturing device, a data storage adapted to store captured image data, and a processor programmed to directly or indirectly interact with the image capturing device or act on the image data received directly or indirectly from the image capturing device and to perform processing steps of the above-mentioned method.

In particular, according to some embodiments, an interactive game system is configured to: receive one or more captured images, segment the one or more captured images so as to detect one or more toy objects in the captured image, recognise one or more of the detected toy objects using a trained classification model such as a deep convolutional neural network. The interactive game system may further be adapted to create a virtual three-dimensional representation of one or more of the recognised toy objects.

According to another aspect, a system is configured to automatically recognize and detect real world toy construction elements, which can be interconnected or combined such as brick, minifigure, minifigure part, weapon, object, accessories, animals or any other construction part or artefact from image or video in real time, the system comprising: one or more toy elements; an imager device; one or more processors configured to execute instructions of computer program modules comprising: a reading module configured to receive image from digital image capture device; a learning database of annotated digital images containing toy elements taken in various conditions and altered with transformations to ensure significant variance for training procedure; a learning module configured to learn digital representations of toy elements by training a deep convolutional neural network thus enabling for very accurate and robust recognitions; a recognition module configured to recognize toy elements from a digital image; a detection module configured to segment image, detect and recognize one or more toy elements from a digital image; a processing module configured to match recognized one or more toy elements with the information stored in the central database or on the web.

Additional features and advantages will be made apparent from the following detailed description of embodiments that proceeds with reference to the accompanying drawings.

BRIEF DESCRIPTION OF THE DRAWINGS

Preferred embodiments of the disclosure will be described in more detail in connection with the appended drawings, which show in FIGS. 1A-B schematically illustrates an embodiment of the system described herein.

DETAILED DESCRIPTION

The following description relates to embodiments of the usage of a convolutional neural network trained on a central processing unit ("CPU") or graphics processing unit ("GPUs") architectures to enable accurate and robust optical recognition of toy objects and, particularly construction toys and parts thereof. The one or more GPUs are used during model creation to quickly perform a series of forward and backward passes on input data in parallel manner, modifying and refining the network parameters on each pass.

Embodiments of the method and system disclosed herein may be used in connection with a variety of toy objects and, in particular construction toys that use modular toy construction elements based on dimensional constants, constraints and matches, with various assembly systems like magnets, studs, notches, sleeves, with or without interlocking connection etc. Examples of these systems include but are not limited to the toy constructions system available under the tradename LEGO. For example, U.S. Pat. No. 3,005,282 and U.S. D253711S disclose one such interlocking toy construction system and toy figures, respectively. Accordingly, in various embodiments of the disclosure, toy objects can be interlocking toy construction elements such as bricks, parts, accessories, mini-figures, weapons, animals, plants or other pieces that can be physically attached to form a toy assembly. A system is configured to automatically detect and recognize real world toy objects e.g. LEGO bricks, minifigures, minifigure parts, weapons, other toy elements or objects, accessories, animals or any other construction elements or artefacts from one or more images or from video in real time.

Figure 1A:
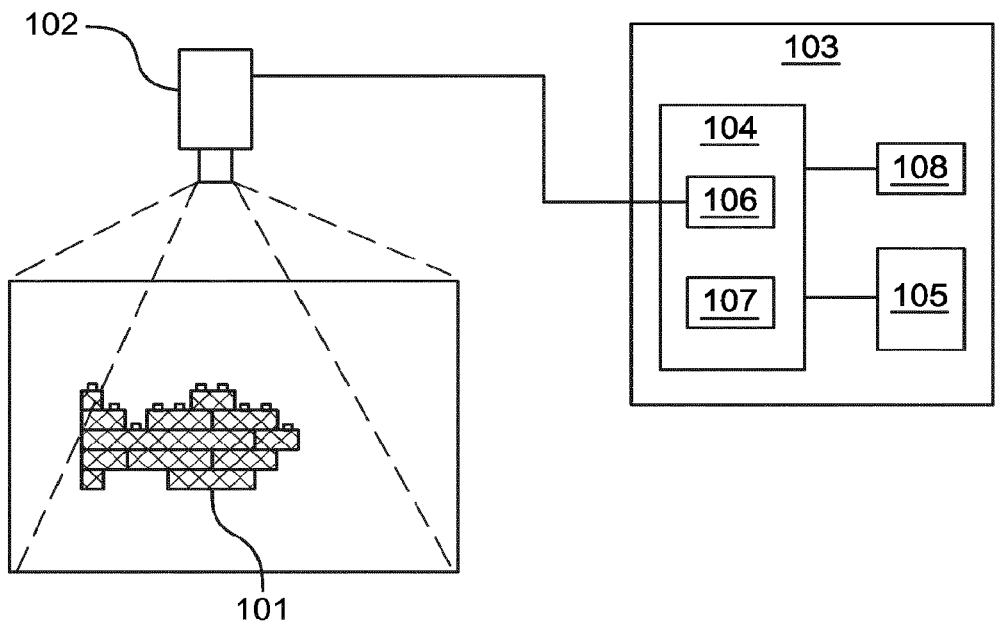
Figure 1B:
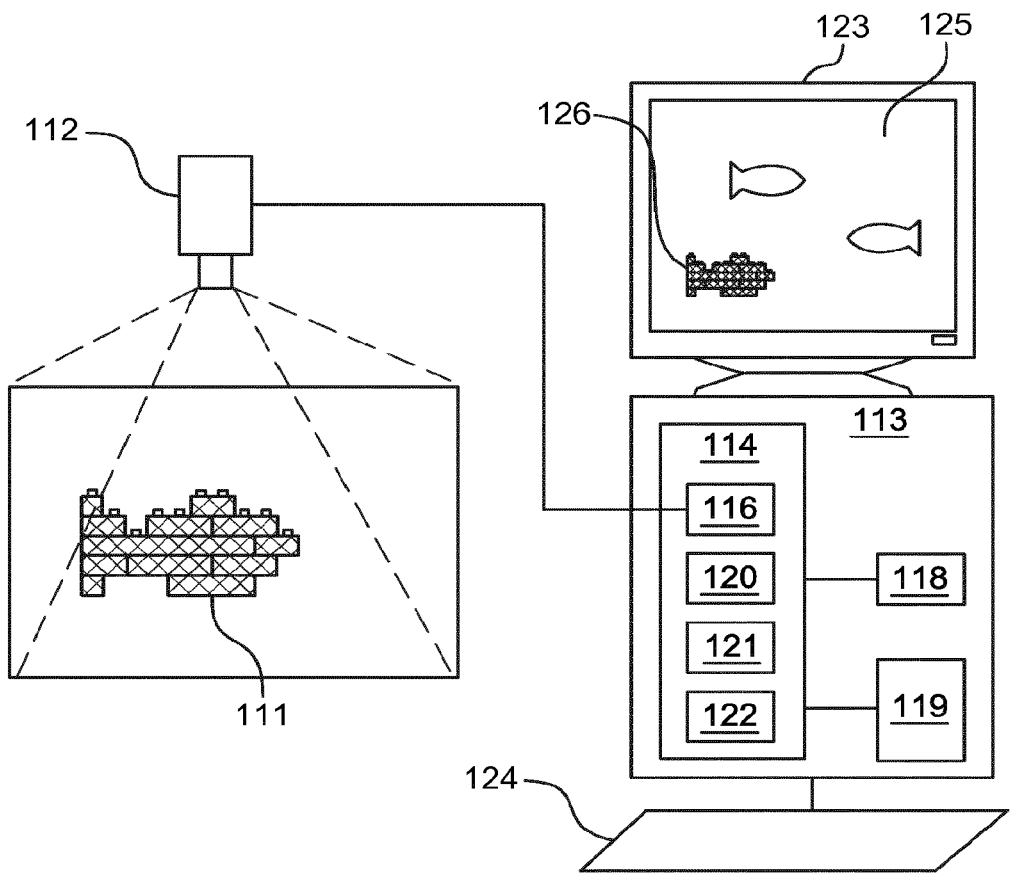

FIG. 1 schematically illustrates an embodiment of the system described herein. The system comprises one or more toy objects, a training system and a recognition system.

The training system comprises: one or more toy objects 101; an image capturing device 102; a data processing system 103 comprising one or more processors 104 configured to execute instructions of computer program modules, a training database 105 of annotated digital images of toy objects taken under various conditions and altered with transformations to ensure significant variance for the training procedure; a reading module 106 implemented by the processor and configured to receive a digital image from a digital image capturing device; a training module 107 implemented by the processor and configured to learn to recognise digital representations of toy objects by training a deep convolutional neural network, thus enabling for very accurate and robust recognitions; a storage medium 108 or another output interface for storing or otherwise outputting a digital representation of the trained neural network.

The training system may further comprise a detection module configured to detect one or more toy elements from a digital image. The reading module 106, the training module 107 and, optionally, the detection module may be implemented by the one or more processors 104.

The recognition system comprises: one or more toy objects 111; an image capturing device 112; a data processing system 113 including one or more processors 114 configured to execute instructions of computer program modules, a display 123 to display a virtual environment 125 of another game experience, and a keyboard 124 and/or other user interface, a digital representation 118 of the trained neural network, e.g. stored in a storage device of the data processing system; a toy object database 119 of known toy objects; a reading module 116 configured to receive a digital image from a digital image capturing device; a detection module 120 configured to detect one or more toy objects from a digital image; a recognition module 121 configured to recognize toy elements from a digital image; a processing module 122 configured to match recognized one or more toy objects with the information stored in the toy object database.

The reading module 116, the recognition module 121, the detection module 120 and the processing module 122 may be implemented by the one or more processors 114.

The digital representation 118 of the trained neural network and/or the toy object database 119 may be stored on a local storage device of the recognition system or on a remote storage device accessible to the recognition system, e.g. via the internet or another suitable communication channel.

It will be appreciated that the recognition system and the training system may be combined in a single data processing system. The recognition system and the training system may share one or more components, e.g. a common image capturing device, one or more common processors, common software modules, e.g. a common reading module, a common detection module, etc. In alternative embodiments, the training system and the recognition system may be completely separate devices.

The recognition system may e.g. be implemented by a mobile application or a program executed on a client computer or other client device, thus eliminating the need of an internet or other network connection. In particular on devices having a modern GPU (e.g. NVIDIA Tegra or NVIDIA Jetson on mobile device), efficient stand-alone recognition systems may be implemented. Alternatively, the recognition system may be implemented as a distributed system, e.g. a client-server or cloud-based architecture. For example, in a distributed embodiment, the trained neural network may be implemented on a server or otherwise remotely such that the classification/recognition is performed in the cloud. This allows for an easy update of the model, but it may require an Internet or other network/communication connection. Moreover, due to fewer constraints on computational resources, a server-side prediction can be significantly faster and model can be very complex, but there may be some overhead in the communication between a mobile app and a server.

The training system may be implemented on any suitable data processing system, such a system comprising one or more central processing units (CPUs), graphics processing units (one or more GPUs), on computer clusters or grids (e.g. using distributed learning processes), etc. The reading module 106 and the reading module 116 are each configured to read an image, said image including an image of one or more real world toy objects.

The detection module 120 is a submodule of the recognition system and it is configured to extract from said read image, an image of said one or more toy objects. To this end, the detection module is configured to detect one or more toy objects in a digital image and to extract the position of the detected toy object within the image, e.g. represented by coordinates of the toy object. The detection module may further extract the detected toy objects from a background portion of the digital image. The detection module may thus be configured to segment a digital image and detect one or more toy objects in the digital image.

The training database 105 contains annotated images where the images are associated with information about the toy objects depicted in said images. The training database can be expanded by adding additional images of toy objects that exist in the training database and new images of new toy objects that have not previously existed in the training database.

The training module 107 is configured to learn digital representations of toy objects whose images are stored in the training database and thus to create a model for recognition/classification of toy objects. The training module is implemented as a deep convolutional neural network comprising of convolutional, rectification, and normalization, pooling and fully connected layers of artificial neurons. The training module may be implemented as a set of computer program instructions that can be run on one or more central processing units ("CPU") or one or more graphics processing units ("GPU") and thus enabling for a fast learning process.

The recognition module 121 is a submodule of the recognition system and it is configured to use the created model for recognition to recognize unknown toy objects detected in a digital image. The recognition model is configured to feedforward a digital image into a trained convolutional neural network causing the network to output a prediction result. The prediction result may include one or more likelihoods that said image contains certain objects from the said training database. The recognition module may be implemented as computer program that runs on a mobile device, or on a personal computer, or on a server.

The processing module 122 uses an identifier of the recognized toy object and matches that information with additional information stored in the toy object database 119, e.g. central database or a web source, e.g. via a web service or other network protocol. The processing module may further be configured to execute a video game or other game experience which may include creating a virtual model 126 of the recognised toy object in a virtual environment 125.

The toy objects may be toy construction elements such as a minifigure, a minifigure part, a weapon, an accessory, a tool, an animal, a motor part, an electronic sensor part, or another form of toy construction element. Alternatively, the toy object is an assembly of more toy construction elements which are physically interconnected with each other.

Figure 2:
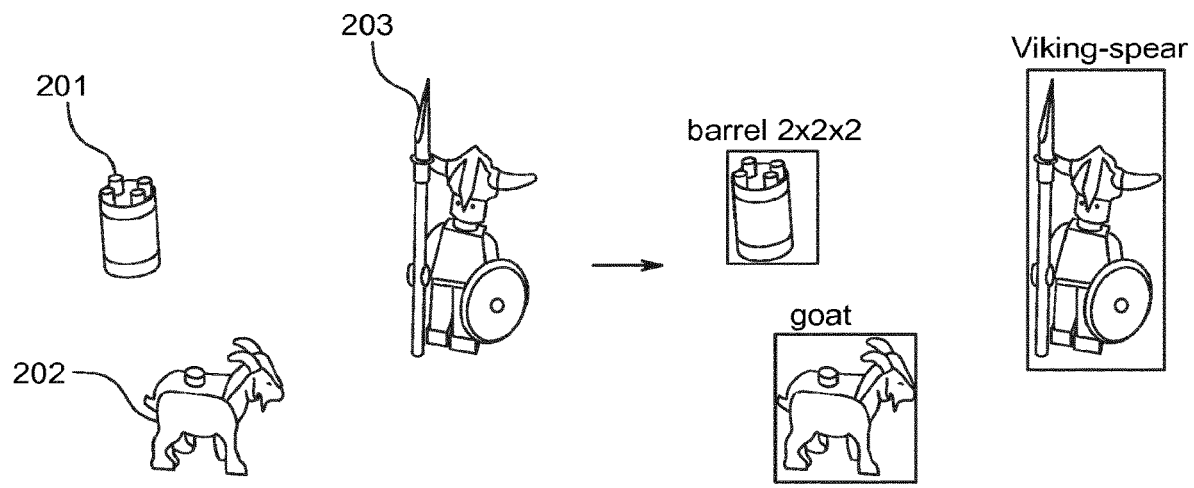
FIG. 2 shows a possible configuration of objects within a scene and illustrates a result of the recognition process described herein.
Figure 3:
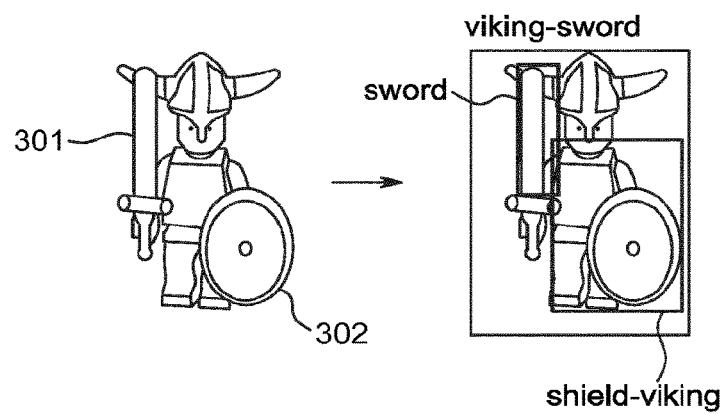
FIG. 3 depicts an example where an embodiment of the system described herein is used to classify hierarchical objects.

FIG. 2 illustrates a possible configuration of toy objects within a scene. As it can be seen on the left image of the figure, there are three objects 201, 202 and 203. All these objects are segmented and correctly classified which is shown on the right image of FIG. 2. Bounding boxes are placed around the objects and object labels are put on the top left corner of the recognized objects. Hence, FIG. 2 illustrates an example of the result of the detection and recognition modules. More particularly, FIG. 2 shows a possible scenario where various toy objects are placed on a surface, and a digital image is captured via an image capturing device such as digital camera. The left image of FIG. 2 depicts the original scene with three different objects—a barrel 201, a goat 202 and a Viking minifigure 203 holding a spear. The right image includes bounding boxes surrounding the detected objects. Labels above the rectangles show the results of the recognition task. As can be seen barrel 201 and goat 202 are recognized and the specific configuration of the Viking FIG. 203 holding a spear is also recognized. FIG. 3 depicts a scenario where the same Viking figure is recognized as holding a sword weapon.

FIG. 3 depicts a scenario where the system is used to classify a hierarchical object, i.e. an object including multiple toy construction elements that may be interconnected with each other. As can be seen form FIG. 3, a minifigure is correctly recognized and then lower hierarchy level objects are recognized such as weapons, more specifically a sword 301 and a shield 302. FIG. 3 depicts a scenario where the system is used to make hierarchical object recognition. At the top most level, the recognized object is a Viking mini-figure holding a sword. At lower hierarchy level there are recognized objects sword 201 and shield 202, more specifically Viking's shield 202.

Figures 4A, 4B, 4C:
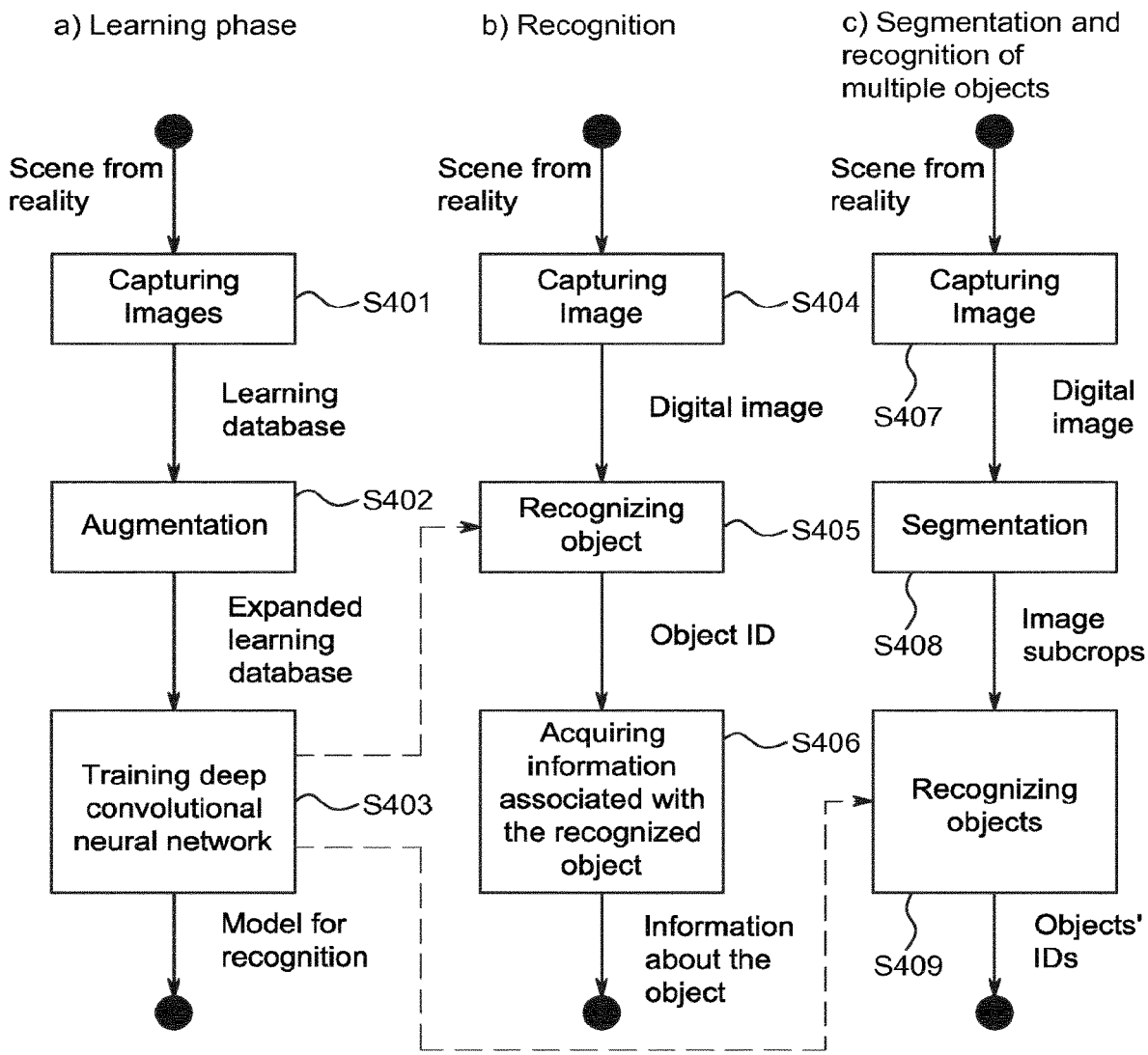
FIGS. 4A-C depict steps used to implement embodiments of the training and recognition process.

FIG. 4 depicts steps of a method implemented by a system as disclosed herein, e.g. by the system of FIG. 1. In particular, FIG. 4 depicts an embodiment of a workflow of a computer implemented method which includes two stages: a learning stage and a recognition stage. The learning stage will also be referred to as training stage. FIG. 4A illustrates an embodiment of the learning stage; FIG. 4B illustrates a first embodiment of the recognition stage while FIG. 4C illustrates a second embodiment of the recognition stage. The first embodiment of the recognition stage only includes a recognition process while the second embodiment of the recognition stage includes a detection sub-process and a recognition sub-process. The recognition sub-process may also be referred to as a classification sub-process. All stages are computer-implemented.

The learning stage, which may be performed by a suitably programmed processor of a training system, comprises the following steps:

In an initial step S401, the process reads digital images; each image may represent a still image captured with digital camera or a fragment of a video sequence captured with video camera. The process may read the digital image from an input device, e.g. directly from an image capturing device, from a storage device, or the like.

In subsequent step S402, the process creates a training database of digital images depicting toy objects. Creating the training database may be done by taking many images of toy objects and annotating them with information about which toy object is present on each image. In some embodiments, the step may further comprise one or more image processing steps, e.g. subtracting the mean intensity value of the image so as to normalize the pixel colour intensities. The images of toy objects may contain objects at various locations within an image, images showing toy objects captured from various viewpoints relative to the object, i.e. from various angles, distances, rotations, etc. The images may include images captured by different cameras and/or under different illumination conditions and/or in front of different backgrounds, etc. In some embodiments, the training database is artificially expanded by creating new images from the existing ones by applying additional image processing steps, such as horizontal or vertical flips, scaling, rotation, changing colour intensities and/or performing affine transformations of existing images.

In subsequent step S403 the process performs an iterative learning process in which parameters of a neural network model are iteratively adapted so as to improve the network's classification performance in respect of the captured images. i.e. so as to learn from the captured images. The learning step results in a neural network model that is trained to recognize toy objects that are present in an image.

The learning process is achieved by training a deep convolutional neural network whose hyper-parameters are chosen based on the performance on validation portion of the training database. The learning step may be implemented as a series of training steps in which a deep convolutional neural network is optimized via a suitable optimization algorithm like e.g. stochastic gradient descent. The learning step results in a trained model that may subsequently be used in a recognition task. The training of a deep convolutional neural network may be conducted using a training process known as such in the art, e.g. by a series of forward and backward passes of input information and gradients, respectively. The deep convolutional neural network consists of convolutional, rectification, normalization, pooling, interconnected and softmax layers. A convolutional neural network is regarded as deep when it comprises at least four layers. In some embodiments the deep convolutional neural network comprises at least 5 layers, such as at least 6 layers, e.g. layer receiving an output of the previous layer as an input. In some embodiments, the top level inter-connected layers of the said network can be replaced by another classification algorithm which uses outputs from convolutional layers as inputs for classification.

FIG. 4B shows a workflow in which a trained model is used for the recognition task: in initial step S404 of the recognition stage illustrated in FIG. 4B, the process reads a digital image depicting a toy object to be recognised. The digital image may be an image that has been captured by a digital camera or another suitable image capturing device. The digital image is sent to the recognition module which uses the trained model (e.g. trained by the process of FIG. 4A) to recognize a toy object on the captured image.

To this end, in subsequent step S405, the process recognizes a toy object if the said toy object is present in the captured image. The image will typically be an image that is different from the images included in the training database. e.g. showing the object from a different viewpoint and/or under different lighting conditions and/or in front of a different background. Recognizing the toy object from an input digital image is done by conducting a forward pass through trained neural network that was created during the learning stage. The output from the neural network represents one or more probabilities for respective known objects—i.e. objects represented in the training database-being present in said image. Recognizing can be done as a series of forward passes of different subcrops of an input digital image and outputs from the trained network can be averaged to increase the prediction accuracy.

Optionally, in subsequent step S406, the process matches the information from a toy object database of known toy objects with the recognized toy element. For example, the information may include a 3D model of the object, connectivity information reflecting how the toy object can be interconnected with other toy objects, virtual attributes of the toy objects in a virtual environment, and/or the like. Other examples of information may include the price of a toy object, existing colours, construction sets where the element appears, buying locations and other information stored in the database or a web source. Matching information from a toy object database or a web source with a recognized real world toy objects may be conducted by querying a database or a web service.

FIG. 4C depicts a workflow in which an additional object detection step is performed before the actual recognition in order to segment the input image, e.g. if more than one object have to be recognized.

In initial step S407 of the recognition stage illustrated in FIG. 4C, the process reads a digital image depicting a toy object to be recognised, e.g. as described in connection with step S404 of FIG. 4B.

In subsequent step S408, the process performs a detection process on the captured image in order to detect one or more toy objects in the captured image. Generally, detection can be done in several ways, like extracting the contours after edge detection with e.g. Canny algorithm, and then performing the above described recognition tasks for each image region where a contour is found, or by using a sliding window approach and by gathering top prediction scores and thus identifying regions of the image which contain objects that are likely toy object candidates. The detection may use a colour-based detection, selective search or any other detection method. The detection may be done by taking different subcrops of a digital image by a sliding window and/or following an edge recognition and/or contour extraction process and/or by another suitable detection algorithm.

The process then performs a recognition step S409 on the segmented image, e.g. as described in connection with step S405 of FIG. 4B. If the detection step has resulted in multiple detected objects, the recognition process may be performed on each of the detected objects. Recognition of the one or more toy objects is thus performed as one or more recognition/classification steps after the detection of a digital image. It will be understood that the process of FIG. 4C may include a further processing step, e.g. as the processing step S406 of FIG. 4B.

Embodiments of the neural network training process described herein can be achieved on any of a variety of devices in which digital signal processing can be performed. Examples of these devices include, but are not limited to: desktop and laptop computers, servers, digital recording devices, gaming consoles, portable gaming devices, mobile devices etc.

The mentioned storage media for storing the executable files of the described system and for storing the training database or trained model may be removable or non-removable. This includes magnetic disks, magnetic tapes or cassettes, solid state disks, CD or DVD ROMs, USS disks or any other medium which can be used to store information and which can be accessed within the computing environment.

Convolutional neural network design involves a number of hyper-parameters to be specified. These hyper-parameters include, but are not limited to: number of neurons, number of layers, types of layers (convolutional, pooling, rectification, normalization, dropout, fully connected, softmax etc.) and their arrangement, learning rates, decay rates, number of learning iterations, batch sizes etc. The exact configuration of these parameters is typically found via experiments on the particular problem that is being solved i.e. the specific training database that is being used. During these experiments, networks for respective selections of hyper-parameters may be trained based on a subset of the images in the training database: the performance of the trained networks then be monitored based on validation and test data sets, and a set of hyper-parameters may be selected that provides high performance criteria. The various hyperparameters of the deep convolutional neural network can be used in combination or independently.

Figure 5:
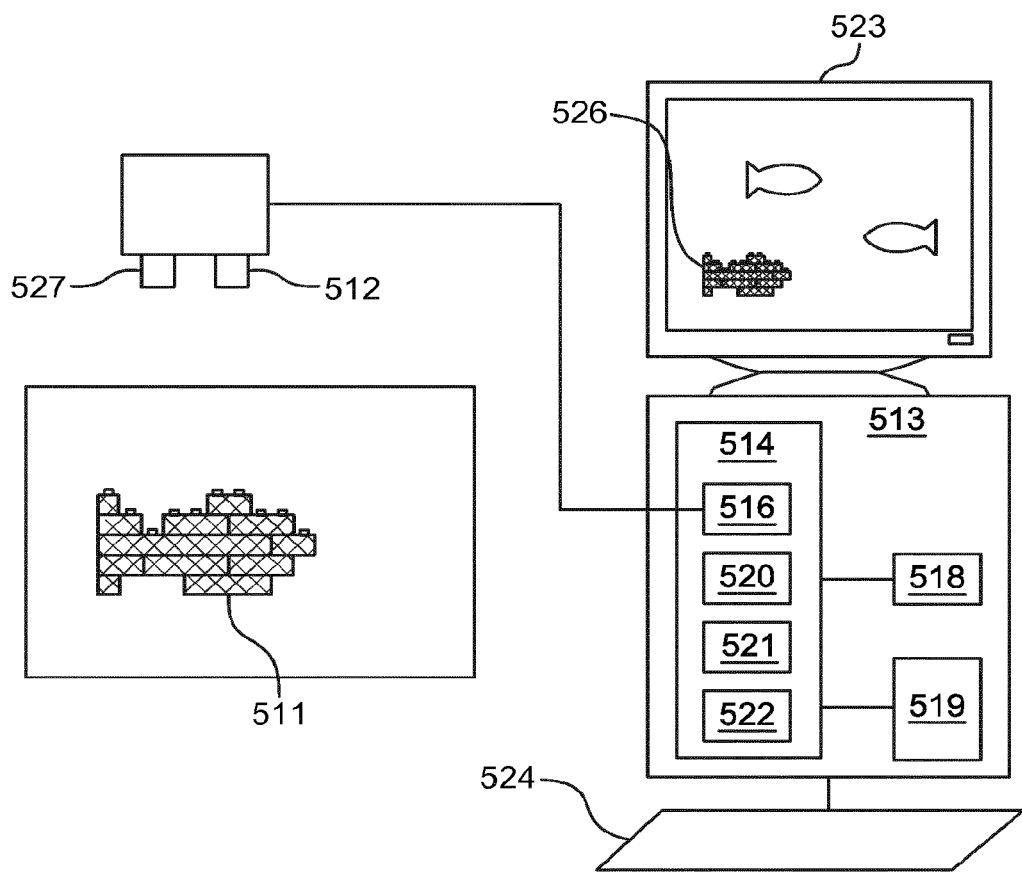
FIG. 5 schematically illustrates an embodiment of a game system that uses an embodiment of the training and recognition processes described herein.

FIG. 5 schematically illustrates an embodiment of a game system that uses an embodiment of the training and recognition processes described herein.

In particular, the game system provides a real-world building experience with physical toy construction elements and brings that experience into the digital world. The game system automatically generates digital representations of toy construction elements as they are used by the user in a physical building process to create a physical toy construction assembly or model, and the system accurately creates in real time a digital version of the resulting assembly that is being built. The digital representation of the assembled toy may have specific behaviours in the digital environment based on the physical toy construction elements that have been used in the real-world construction process. Seamless integration of physical and digital game experiences is achieved as described in the following.

The game system comprises the following main components: physical toy construction elements that may be detachably interconnected with each other to form a toy assembly 511, a depth camera 527, a video camera 512 operable to produce a color image of a scene including a toy assembly/model. The video and depth cameras may be integrated into a single unit, or they may be separate units arranged in a fixed spatial relation to one another, a computing device 513 having stored thereon a computer program executable by a processor 514 of the computing device. The computer program includes several main modules: a signal processing module 516, a 3D detection module 520, an object recognition module 521 and a user experience module 522. The computing device further comprises a display 523 and a user interface device 524.

The computing device 513 further comprises a storage medium 518 having stored thereon a representation of a trained neural network and a database 519 comprising information about toy construction elements, such as 3D models and attributes of the toy construction elements. The signal processing module 516 is operable to interpret input signals from the depth camera and the video camera. The input signals are processed in real time as the depth and video information is retrieved from the respective cameras. The signal processing module performs pose estimation on the color image input, so the position and orientation of the video camera relative to the scene is determined. This can be done by locating (as 2D pixel positions) a number of distinct image features for which the (3D) physical position is known, and by estimating the position and orientation of the camera relative to the scene from these 20-to-3D correspondences. There exist a number of feature descriptors that may be used, such as SURF, SIFT, BRISK, ORB, FREAK, HoG. An example of a pose estimation process is described in "Fast and globally convergent pose estimation from video images." C. P. Lu, G. D. Hager and E. Mjolsness, IEEE Pattern Analysis and Machine Intelligence 22(6), 610-622, 2000.

Based on prior information about the relative position and orientation between the color and depth sensors, the relative position of the depth camera with respect to the toy model is computed from the computed position of the video camera. Temporal noise filtering is performed on the depth signal. Based on a camera model, which is indicative of a relationship between the position of a pixel in the image and the direction of the incoming light in physical space, the depth signal may be translated into a 3D point cloud where each depth sample is translated into a physical 3D position.

Each pixel in the color image is classified into the most probable color in the set of colors of the toy construction elements. The classification may be based on a machine learning algorithm which locates in the color image a number of toy construction elements that are placed at known physical positions relative to the toy construction model being built. Each of the toy construction elements has a known color, and by looking at the pixels depicting each toy construction element, a classifier can trained that, given a color sample, can estimate the probability of this color belonging to the different color classes. This can be done using support vector machines or another machine learning technique.

The 3D detection module 520 is operable to detect changes in the scene. Based on the input from the signal processing module, the 3D detection module maintains a 3D model of the scene in memory and compares input information from the depth camera with the 3D model. If changes between the input signal and the 3D model in memory are detected, the video information from the video camera is sent to the object recognition module. In one embodiment, only a part of the field of view of the video camera is forwarded to the recognition module, e.g. a crop that includes the area of the detected change and a predetermined neighborhood of the detected change. In order to prevent unwanted comparisons when e.g. a user's hand appears in the scene during the building process, a hand detection process may be included in the 3D detection module. For example, if parts of the 3D point cloud from the current sensor input are found to be inside a virtual 3D zone around and above the building area, the process determines that this change is due to the user reaching a hand or an arm towards the toy model. If hands are detected in the scene, no comparison will be conducted. After the hands are removed from the scene, the 3D detection module will look for changes in the scene as described above. The image that is captured based on the detected change in 3D space is acquired in a way that a region of interest is centered in the newly generated image and an area outside of the assumed region is masked with random Gaussian noise. This mask is dilated and eroded few times to generate several image crops that are all sent to the recognition module.

The recognition module 521 receives the generated image crops from the 3D detection module and uses a trained convolutional neural network to correctly classify the toy construction element shown in the image crops. The classification accuracy is increased by using several image crops with dilated masks from the 3D detection module. After classifying the image, information about the toy recognized toy construction element (e.g. an identifier identifying the type and color of the toy construction element) that is recognized is returned to the 3D detection module 520. In one embodiment, the recognition module 521 outputs a list of possible recognized toy construction elements along with respective confidence scores.

The 3D detection module 520 receives the information about the recognized toy construction element—or list of possible toy construction elements—from the recognition module. Based on this information, the 3D detection module attempts to estimate placement of the toy construction element of the returned list that best fits with the depth signal and the color classifications previously created by the 3D detection module. Because of the physical constraints imposed by the toy construction system when interconnecting toy construction elements, there exists a limited number of positions and orientations each new toy construction element can be added to the existing virtual model. The 3D detection module analyses the possible 3D placements and computes a correspondence score based on the correlation of the possible placement with the depth images and classified color images. These scores may then be combined with the confidence scores from the recognition module to arrive at a combined score for each candidate toy construction element.

The candidate toy construction elements are then sorted according to their respective combined scores and the brick with the highest score is then passed to the user experience module 522 together with a reference position where the newly placed element has been detected. In one embodiment, a list of candidates, for both elements and positions, may be forwarded so as to allow the user experience module to provide the user with an option to select the correct candidate. e.g. by presenting a ranked list and allow the user to use arrow keys on keyboard, a joystick, a touch screen or another user-interface to indicate a user selection. The feedback from user allows additional learning and improvement of the system, e.g. by adding the captured video image along with the user classification to the training database to be used in a subsequent training process of an updated neural network model.

Generally, in some embodiments, a once-trained classification model can subsequently be updated, e.g. so as to fine-tune the classification model for classification of additional, previously unseen toy objects without the need for training the model from the scratch. This may be particularly useful in the context of toy construction systems comprising a large number of toy construction elements having similar features, such as shapes, surface textures etc., where the toy construction system may be expanded by adding new toy construction elements. In some embodiments, a trained convolutional stage of the classification model (i.e. the feature extraction part of the model) may be maintained and an updated training process, e.g. by gradient optimization, may be performed on the classifier stage of the classification model, based on a new training database for learning which includes annotated images of new toy objects. This is a form of supervised pre-training where the nature of toy construction elements with geometrical constants, repeating color and similar texture patterns may be exploited. This process significantly reduces training time since the already learned features are used and only last layers of the classification model (e.g. the interconnected classification part of the network or other classifier) is being updated, i.e. fine-tuned, by a further training process.

The user experience module 522 thus receives information about the newly placed toy construction element and its position in the scene. This module then generates a digital version 526 of the assembly. Hence, an assembly built in the real world is translated into one or more virtual objects in a digital environment and has various attributes which correspond to specific toy construction elements used in the physical building process. For example, if e.g. a car is built, then speed, acceleration, steering etc. may depend on the selected engine parts, tires, on the amount of bricks used etc.

Figure 6:
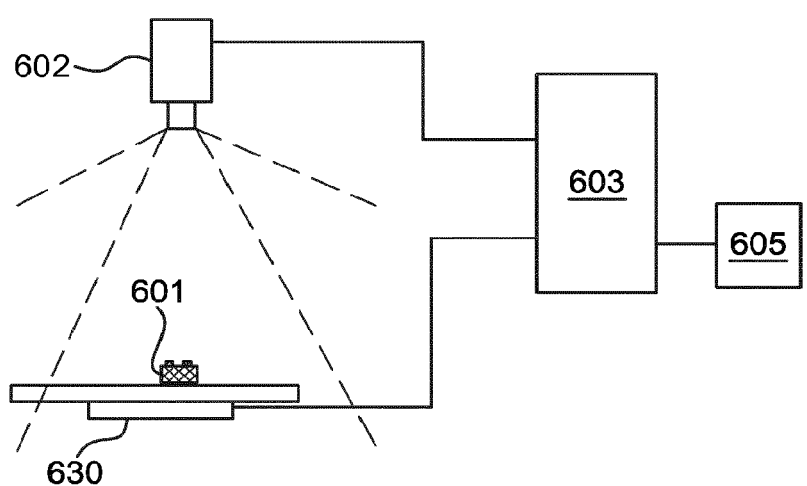
FIG. 6 shows an example of a system for creating a training database for the training of a deep convolutional neural network.

FIG. 6 shows an example of a system for creating a training database for the training of a deep convolutional neural network or other classification model. The system comprises a database 605, a data processing system 603, and an image acquisition station comprising a camera 602 and a platform 630. The platform 630 is configured to receive a toy construction element 601 and to rotate the toy construction element relative to the camera 602. Besides rotation around a vertical axis, the platform rotates around the horizontal axis. The camera and the platform are controlled by the data processing system 603. The camera captures color and depth images from different viewpoints (angles and orientations). The camera is calibrated on every change of the relative position from the platform with respect to horizontal axis. Based on the 3D input, the data processing system detects an image area where the toy construction element is positioned and processes the color image so as to crop a part image from each captured color image. The part-image includes the detected approximate area of the placed toy construction element, e.g. with the detected approximate position of the toy construction element being centered in the image. The data processing system may further generate a mask around the detected, approximate area. This mask may then be replaced with random Gaussian noise and other patterns so that additional variance in the background may be included in the training database. An alternative to acquiring images of each toy element is to use a photorealistic rendering method for generating synthesized images of each toy construction element from different angles and with many different lighting conditions.

In one embodiment, an apparatus for generating large amounts of images for populating a training database may thus be used. A robotic platform may be used with a rotatable plate on which any kind of material can be placed. The plate can be rotated about three axes. In front of the plate, a camera device is placed on a fixed stand. In one image capturing session, a toy object is placed on the plate, the plate is being rotated and the camera periodically acquires images in order to capture the toy object from different viewpoints. On the plate there is a background material in a color different from the toy objects that are being photographed. A robotic platform is not mandatory and several dozens of images can be acquired by hand and, if taken on a consistent background, these photos can be used in the rest of the process. Subsequently, a uniform background may be extracted by using image processing techniques like hue- or saturation-based background extraction or by a similar process. Additionally, using the hue and saturation components of the image, shadows can also be extracted. Hence, a pixel-level annotation of the training image, e.g. annotating each pixel as belonging to the object or the background or, optionally, a shadow may be provided. When the toy object is extracted, this image can then be placed on any simulated background image, most notably common playground backgrounds like table-tops, carpet and floor patterns etc., and in various positions in the image with additional augmentation steps like flipping and skewing and together with or without a shadow to introduce additional variance in the training set. In this way a very large and photo-realistic dataset can be generated automatically or at least with little manual involvement.

In the following, different examples of network architectures of deep convolutional neural networks will be described that are suitable for recognising toy objects. The various embodiments, or combinations thereof, may be used in combination with one or more of the embodiments described above.

EXAMPLE 1: In the first example, a convolutional neural network comprises an input layer followed by a first convolutional layer. The first convolutional layer includes 128 filters of size 13*13. A stride of two pixels is used. This allows the capturing of many relatively complex features like various edges and texture patterns although one would expect simple features on the input. Detailed inspection of the learned features in this first layer showed patterns tuned for detecting small but complex patterns, e.g. patterns printed on minifigures, and gradients between specific colors of the toy objects. The first convolutional layer is followed by a max-pooling layer with size 3*3 and stride 2. The second convolutional layer includes 128 filters of size 7*7. Six additional 3*3 convolutional layers with max-pooling after each two consecutive layers are used, and the number of filters doubles at each second layer. Local response normalization is used after only the first two convolutional layers. On top of the network (i.e. receiving the output of the above convolutional and pooling stage) there are two inter-connected layers, wherein 60% of the neurons are dropped at random in every learning iteration. The interconnected layers include 1024 neurons each. A softmax classifier is used as a final layer with the number of outputs being the same as the number of classes that are being classified, i.e. the number of different toy objects to be recognised.

EXAMPLE 2: In the second example, different sizes of convolutional filters are used, and the network is less deep than in the first example. Moreover, the interconnected layers have fewer neurons so as to lower the memory footprint of the model and enabling faster loading and prediction during runtime on devices with fewer computational resources. This architecture has proven to be especially successful in classification of monochromatic toy construction elements with many plain surfaces (like bricks and other toy construction elements). The network starts with 64 11*11 convolution filters. The second layer counts 64 5*5 filters followed by a 2*2 max pooling layer. The consecutive four layers have 3*3 filter size and max-pooling is performed after each two consecutive convolutions. The number of filters doubles at each second layer. In total six convolutional layers and three max-pooling layers are followed by two interconnected layers counting 384 and 512 neurons, respectively. Throughout the network, stride equals two pixels.

EXAMPLE 3: Implementing several consecutive convolution layers with smaller filter size can significantly reduce the memory footprint due to the lower number of actual parameters that should be learned, while maintaining the same impact in terms of reception field as single-layer larger filter sizes. Additionally, this approach introduces more non-linearities between these layers thus increasing the predictive power of the overall model. The architecture of example 3 utilizes this property. Additionally, in some layers, convolution filters of different sizes are used to capture features of different granularity. The feature maps resulting from these filters are then convolved with 1*1 convolutions to combine responses across channels and reduce their number and thus the computational requirements. These 1*1 convolutions are followed by rectification to introduce additional nonlinearity and increase expressiveness of the model. The architecture begins with 64 7*7 convolutional filters followed by 2*2 max-pooling. The second layer includes 64 5*5 filters. The third layer has a complex arrangement of filter sizes of 3, 5 and 7 pixels preceded with 1*1 convolutions. This pattern repeats in the fourth and seventh layer. Convolutional layers five, six, eight and nine have conventional 3*3 filters. Counting from the start of the network the number of filters doubles after each three layers. Overall, the network has nine convolutional layers. The last layer is an interconnected layer having 2048 units. Throughout the network, stride equals one pixel. This architecture has proven especially successful in classification of several hundreds of classes of toy objects of various kinds and assemblies of toy objects, irrespective of their rich-ness in texture features or whether they are monochromatic. A combination of different sizes of convolutional filters within layers and an increase in depth allowed for this property of the network.

EXAMPLE 4: The architecture according to this example comprises 25 convolutional layers with max-pooling operations after each 5 consecutive layers. The number of filters starts with 64 and doubles after each pooling operation. The convolutional layers are all of the same filter size (3*3) and the number of filters increases as the depth increases, thus enabling the capturing of more and more abstract features. After the convolutional feature-extraction part, there are two inter-connected layers each with 4069 units, and finally a softmax layer with C units where C equals the number of classes. This network has been found to be very useful in recognizing several thousands of classes which include both toy construction elements and toy assemblies constructed of toy construction elements (constructed toys) when learned on several millions of images. To reduce computational requirements, no Local Response Normalization is used in this embodiment, dropout is introduced in the last two layers at a rate of 0.6. There are no 1*1 convolutional filters in this architecture. When trained on huge amounts of data (several millions of images) this architecture performs well even without the dropout technique and convergence is much faster in that case. Throughout the network stride equals one pixel.

Figure 7:
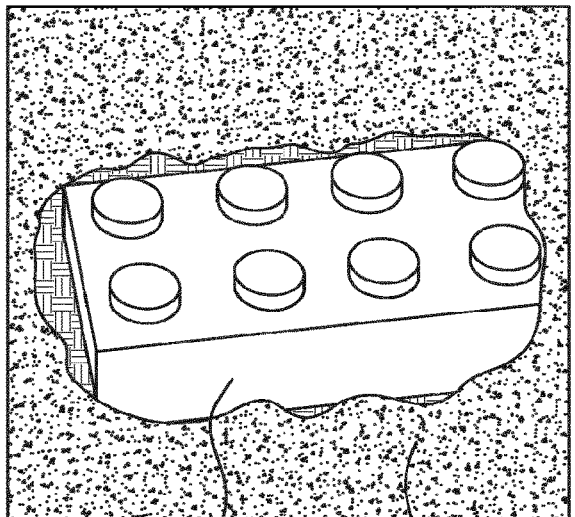
FIG. 7 illustrates an example of different processed versions of a captured image depicting a toy construction element.
Figure 7:
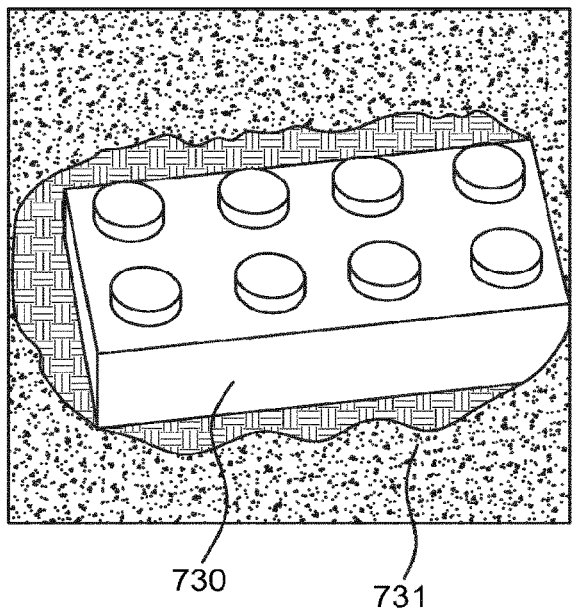
Figure 7:
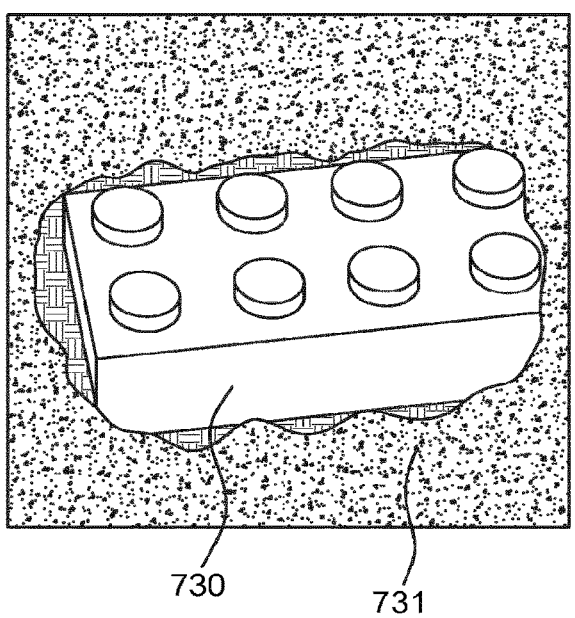

FIG. 7 illustrates an example of different processed versions of a captured image depicting a toy construction element. Each processed version includes an object portion 730 and a background portion 731 in the form of a mask surrounding the object portion. The object portions 730 of the respective images are slightly different from each other and the background portions include random pixel values. In some embodiments of the recognition process described herein, the process creates multiple processed versions of a captured images, e.g. as illustrated in the example of FIG. 7. Each processed version is then fed into the trained classification model which outputs a corresponding classification result. The classification results computer based on the different processed versions of the captured image are then combined, e.g. averaged, so as to obtain a more accurate prediction result.

Although the disclosure has been described with reference to certain specific embodiments, various modifications thereof will be apparent to those skilled in art without departing from the spirit and scope of the disclosure as outlined in claims appended hereto.

What is claimed is:

1. A recognition system for recognizing real-world toy objects from one or more images, wherein the recognition system comprises an image capturing device and one or more processors, the processor implementing a detection module, a recognition module and a user experience module, and wherein the recognition system is configured to:
    capture, by the image capturing device, at least one image of a real-world scene;
    detect, by the detection module, one or more regions of interest in the at least one captured image;
    generate, by the detection module, at least one part-image from the at least one captured image, each part image including at least one of the one or more detected regions of interest;
    feed, by the detection module, the generated at least one part-image to the recognition module;
    recognize, by the recognition module, a real-world toy object in the at least one part-image, the real-world toy object comprising at least one toy construction element; and
    provide, by the user experience module, a digital representation of the recognized real-world toy object.

2. The recognition system according to claim 1, further configured to discard one or more of the part-images based on a confidence parameter output by the recognition system or based on an evaluation whether the recognized real-world toy object is consistent with prior knowledge about other toy objects in the scene and about physical constraints of the placement and/or interconnection of toy objects relative to each other.

3. The recognition system according to claim 1, wherein the recognition system is configured to:
    capture, by the image capturing device, a sequence of images of a real-world scene;
    detect, by the detection module, a change in the scene based on the captured sequence of images;
    generate, by the detection module, a part-image from a captured image of the sequence of captured images, the part image including the detected change;
    feed, by the detection module, the generated part-image to the recognition module;
    recognize, by the recognition module, a real-world toy object in the generated part-image, the real-world toy object comprising at least one toy construction element; and
    provide, by the user experience module, a digital representation of the recognized real-world toy object.

4. The recognition system according to claim 3, wherein the real-world toy object includes at least one toy construction element added by the user to the scene and/or at least one toy construction element repositioned relative to a toy construction model.

5. The recognition system according to claim 3, configured to detect toy objects that have been added to the scene, wherein the recognition module is configured to:
    provide a list of candidate toy objects each having a likelihood of being a newly added toy object;
    determine whether placement of a candidate toy object of said list at the detected position within the scene is compatible with one or more constraints imposed by the toy construction system; and
    determine a most likely one of the candidate toy objects.

6. The recognition system according to claim 3, wherein the recognition module is configured to:
    create a list of candidate object identifiers and associated likelihood scores indicative of a likelihood of the respective candidate object identifiers matching the real-world toy object;
    for each of the candidate object identifiers and based on the captured image, estimate a placement of the corresponding virtual object in a virtual scene corresponding to the real-world scene;
    compute a respective correspondence score for each candidate object identifier based on a correlation of the estimated placement with at least the captured image; and
    select a candidate object identifier and a corresponding placement based at least on the computed correspondence scores.

7. The recognition system according to claim 1, comprising a database of real-world toy objects available for inclusion as virtual objects in a virtual environment, each virtual object being associated with an object identifier of a corresponding real-world toy object and with accompanying information about one or more virtual properties of the virtual object;
    wherein the recognition module is configured to predict a matching object identifier, matching the recognized real-world toy object; and wherein the user experience module is configured to add one or more virtual objects associated with the matched object identifier to a virtual environment, and to affect a gameplay experience based on the accompanying information.

8. The recognition system according to claim 1, wherein the recognition system is further configured to estimate one or more additional attributes of the real-world object depicted in the captured image, in addition to an identification of the real-world object.

9. The recognition system according to claim 8, wherein the one or more additional attribute comprises a relative orientation of the real-world toy object relative to the image capturing device.

10. A recognition system for recognizing real-world toy objects from one or more images, wherein the recognition system comprises an image capturing device and one or more processors, the processor implementing a recognition module and a user experience module, and wherein the recognition system is configured to:
- capture, by the image capturing device, an image of a real-world scene;
- recognize, by the recognition module, two or more real-world toy objects in the captured image;
- create two or more virtual characters corresponding the respective recognized real-world toy objects; and
- control interaction of the created two or more virtual characters with each other, where one or more aspects or results of the interaction are at least in part controlled by virtual attributes of the recognized toy objects.

11. The recognition system according to claim 10, wherein the interaction involves two virtual characters engaging in a battle where capabilities or other attributes of the virtual characters are at least in part determined by features of the recognized toy objects.

12. The recognition system according to claim 11, wherein the capabilities or other attributes of the virtual characters are at least in part determined by detected and recognized accessories connected to the recognized toy objects.

13. The recognition system according to claim 10, comprising a database of real-world toy objects available for inclusion as virtual objects in a virtual environment, each virtual object being associated with an object identifier of a corresponding real-world toy object and with accompanying information about one or more virtual properties of the virtual object;
- wherein the recognition module is configured to predict a matching object identifier, matching the recognized real-world toy object; and wherein the user experience module is configured to add one or more virtual objects associated with the matched object identifier to a virtual environment, and to affect a gameplay experience based on the accompanying information.

14. The recognition system according to claim 10, wherein the recognition system is further configured to estimate one or more additional attributes of the real-world object depicted in the captured image, in addition to an identification of the real-world object.

15. The recognition system according to claim 14, wherein the one or more additional attribute comprises a relative orientation of the real-world toy object relative to the image capturing device.

16. A toy construction system, comprising a plurality of toy construction elements, an image capturing device and a processor programmed to receive image data from the image capturing device, the image data representing a digital image captured by the image capturing device, wherein the plurality of toy construction elements includes primary toy construction elements of a first class of toy construction elements, and secondary toy construction elements of a second, lower-level class of toy construction elements, the secondary toy construction elements representing accessories to the primary toy construction elements;
wherein the processor is configured to:
- recognize a hierarchical toy object including multiple toy construction elements, the multiple toy construction elements including at least one of the primary toy construction elements and one of the secondary toy construction elements connected to the primary toy construction element, and
- based on the recognition of the primary and the secondary toy construction elements, perform a composite recognition of the primary toy construction element supplemented by the recognized secondary toy construction element.

17. The toy construction system according to claim 16, wherein the first class of toy construction elements represent figurines or minifigures and wherein the second class of toy construction elements represent accessories to a figurine or minifigure.

18. The toy construction system according to claim 17, wherein the accessories include weapons, cloth items, and/or tools.

19. The toy construction system according to claim 16, comprising a database of real-world toy objects available for inclusion as virtual objects in a virtual environment, each virtual object being associated with an object identifier of a corresponding real-world toy object and with accompanying information about one or more virtual properties of the virtual object; wherein the processor is configured to:
- predict a matching object identifier, matching the composite recognition of the primary toy construction element supplemented by the recognized secondary toy construction element;
- add one or more virtual objects associated with the matched object identifier to a virtual environment, and
- affect a gameplay experience based on the accompanying information.

20. The toy construction system according to claim 16, wherein the processor is further configured to estimate one or more additional attributes of the real-world object depicted in the captured image, in addition to an identification of the real-world object.

* * * * *